United States Patent [19]

Meininger et al.

[11] Patent Number: 4,649,193
[45] Date of Patent: Mar. 10, 1987

[54] WATER-SOLUBLE DYESTUFFS CONTAINING FIBRE-REACTIVE GROUPS OF THE VINYLSULFONE SERIES AND THE FLUORO-S-TRIAZINYL-AMINO SERIES

[75] Inventors: Fritz Meininger, Frankfurt am Main; Joachim W. Otten, deceased, late of Offenbach am Main; by Ursula Otten, heir, Heidelberg; by Anna G. Rudolph née Otten, heir, Dillenburg, all of Fed. Rep. of Germany

[73] Assignee: Hoechst Aktiengesellschaft, Frankfurt, Fed. Rep. of Germany

[21] Appl. No.: 519,211

[22] Filed: Aug. 1, 1983

Related U.S. Application Data

[63] Continuation of Ser. No. 266,370, May 22, 1981, abandoned.

[30] Foreign Application Priority Data

May 24, 1980 [DE] Fed. Rep. of Germany ....... 3019936

[51] Int. Cl.$^4$ .................... C09B 62/06; C09B 62/085; C09B 62/095; C09B 62/10
[52] U.S. Cl. ..................... 534/622; 534/598; 534/617; 534/618; 534/625; 534/628; 534/635; 534/636; 534/637; 534/638; 534/642; 544/181; 544/187; 544/189; 544/209
[58] Field of Search ........... 260/146 R, 146 D, 146 T, 260/153; 634/617, 622, 628, 632, 636, 638, 642

[56] References Cited

U.S. PATENT DOCUMENTS

| 3,223,470 | 12/1965 | Boedeker et al. | 260/163 X |
| 3,591,577 | 7/1971 | Moiso et al. | 260/153 |
| 4,341,699 | 7/1982 | Tezuka et al. | 260/153 |

FOREIGN PATENT DOCUMENTS

| 1265698 | 4/1968 | Fed. Rep. of Germany | 260/153 |
| 1487628 | 5/1967 | France | 260/146 T |
| 2034343 | 6/1980 | United Kingdom | 260/153 |

OTHER PUBLICATIONS

Henk et al. II, Chemical Abstracts, vol. 93, 133818q (1980).
Farbweaue, Chemical Abstracts, vol. 58, 12712d,e,f,g (1962).
Seiler, Chemical Abstracts, vol. 92, 199745z (1980).
Sterniak, Chemical Abstracts, vol. 78, 148950r (1973).

Primary Examiner—Floyd D. Higel
Attorney, Agent, or Firm—Curtis, Morris & Safford

[57] ABSTRACT

Water-soluble fibre-reactive dyestuffs containing one or two fibre-reactive groups of the vinylsulfone series and one or two fibre-reactive groups of the fluoro-s-triazinyl-amino series. These dyestuffs can be applied on fibre materials containing hydroxy and/or carbonamide groups by known application and fixation techniques for fibre-reactive dyes to yield deep and fast dyeings on these materials.

4 Claims, No Drawings

WATER-SOLUBLE DYESTUFFS CONTAINING FIBRE-REACTIVE GROUPS OF THE VINYLSULFONE SERIES AND THE FLUORO-S-TRIAZINYL-AMINO SERIES

This application is a continuation of copending application Ser. No. 266,370 filed May 22, 1981, now abandoned.

The invention relates to the technological field of fiber-reactive dyes.

German Offenlegungsschrift No. 2,927,102 has disclosed azo dyes which contain a fiber-reactive radical from the vinylsulfone series and, as a further fiber-reactive radical, a monofluorotriazinyl radical. The dyes described therein, however, have certain technological drawbacks so that they do not fully meet the various requirements.

The present invention now provides new valuable water-soluble compounds which contain sulfo groups and correspond to the general formula (1)

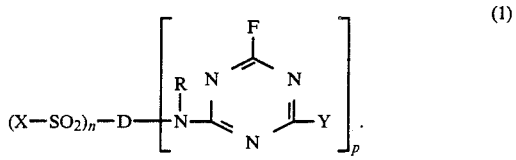

(1)

In this formula (1):

D is the radical of an organic dye molecule which preferably contains sulfo groups, X is a vinyl, β-thiosulfatoethyl, β-sulfatoethyl or β-chloroethyl group, R is a hydrogen atom or an alkyl group having 1 to 4 C atoms, n is the number 1 or 2, p is the number 1 or 2 and Y is a radical of the formula —O—$R^1$ or of the formula —S—$R^1$ or of the formula

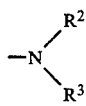

in which $R^1$ represents an optionally substituted alkyl radical having 1 to 4C atoms or an aromatic carbocyclic or aromatic heterocyclic radical, each optionally substituted, $R^2$ is a hydrogen atom or an optionally substituted lower aliphatic radical or a cycloaliphatic radical and $R^3$ denotes a hydrogen atom, an optionally substituted lower aliphatic radical, an optionally substituted aromatic carbocyclic radical, a lower alkoxy group, a cyano group, a group of the formula —C-S—$NH_2$ or an optionally substituted amino group, or $R^2$ and $R^3$, conjointly with the nitrogen atom, form a ring which contains a lower alkylene and, if appropriate, a hetero-atom, such as, for example, a nitrogen or oxygen atom, such as, for example, a morpholino, piperidino or piperazino ring.

Lower aliphatic radicals are in particular lower alkyl and alkenyl radicals.

The designation "lower", as used in the above definitions, means here and in the following text that the alkyl or alkylene radical contained in the group comprises 1 to 4C atoms and the alkenyl radical comprises 2 to 4C atoms.

Examples of substituted lower alkyl radicals are alkyl groups having 1 to 4C atoms, which are monosubstituted or disubstituted by substituents from the group comprising acetylamino, hydroxy, sulfato, β-sulfatoethylsulfonyl, β-thiosulfatoethylsulfonyl, lower alkoxy, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl.

A cycloaliphatic radical is, for example, the cyclohexyl radical. Aromatic carbocyclic radicals preferably are phenyl and naphthyl radicals; these can be substituted, for example, by substituents from the group comprising carboxy, sulfo, lower alkyl, lower alkoxy, hydroxy, chlorine and β-sulfatoethylsulfonyl.

Optionally substituted amino groups which can represent the formula moiety $R^3$ are, for example, the amino group itself, a lower alkylamino and dialkylamino group each with lower alkyl radicals, a N-methyl-N-phenylamino group or a phenylamino group, or a phenylamino group which is substituted in the phenyl radical by substituents from the group comprising sulfo, carboxy, chlorine, lower alkyl and lower alkoxy, or a group of the formula

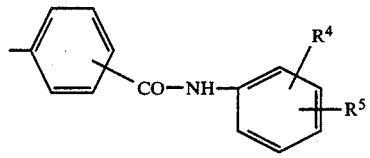

in which $R^4$ denotes a hydrogen atom, a chlorine atom, a methyl or methoxy group or a nitro group and $R^5$ represents a sulfo group or a β-sulfatoethylsulfonyl or β-thiosulfatoethylsulfonyl group.

The formula moiety D preferably is the radical of a water-soluble organic dye which contains a sulfo group, such as, in particular, the radical of a monoazo dye or disazo dye, which contains a sulfo group, or of a 1-amino or 1-anilino-anthraquinone dye which contains a sulfo group, in particular a derivative of the 4-phenylamino-1-amino-anthraquinone-2-sulfonic acid dye, or of a phthalocyanine dye which contains a sulfo group, in particular of a copper- or nickel-phthalocyanine dye, the sulfo group or groups being preferably bonded to the phthalocyanine radical, or of a formazan dye which contains a sulfo group and a metal, such as, in particular, copper- or nickel-formazan dyes, or the radical of an azo dye which contains a sulfo group and a metal, such as, in particular, copper, chromium, cobalt or nickel complexes of a mono- or dis-azo dye containing a sulfo group. Amongst these, water-soluble azo compounds, metal complex azo compounds and phthalocyanine compounds are preferred according to the invention.

As the groups which confer solubility in water, the formula moiety D preferably contains one or more, such as 2 to 6, sulfonic acid groups and/or carboxylic acid groups.

The new colored compounds of the general formula (1) can be present in the form of the free acid and also in the form of their salts. They are preferred in the form of the salts, in particular the alkali metal salts and alkaline earth metal salts, in particular in the form of the sodium, potassium and calcium salts. They are preferably used, in the form of the alkali metal salts, for the dyeing and printing of fiber materials.

The present invention also relates to processes for the manufacture of the new colored compounds of the general formula (1). These processes comprise reacting a compound of the general formula (2)

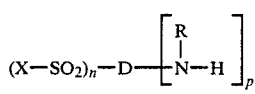  (2)

in which D, R, X, n and p have the meanings defined above, with a difluorotriazine compound of the general formula (3)

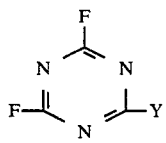  (3)

in which Y has the meaning defined above, with the elimination of one mole of hydrogen fluoride, or reacting a compound of the general formula (2) defined above, initially with 2,4,6-trifluoro-1,3,5-triazine (cyanuric fluoride), to give the difluorotriazine compound of the general formula (4)

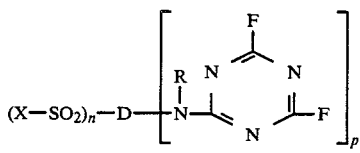  (4)

in which D, R, X, n and p have the meanings defined above, and subsequently reacting this compound of the formula (4) with an equimolar amount of an amine of the general formula (5)

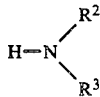  (5)

in which $R^2$ and $R^3$ have the meanings defined above, or reacting a component of the dye radical D, such as a precursor of D, which contains one or two above-defined groups of the formula —SO$_2$—X, with a second component of the dye molecule D, such as a precursor of the latter, which contains the monofluoro-triazinylamino radical of the general formula (3a)

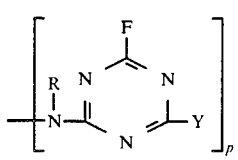  (3a)

R, Y and p having the meanings defined above, or reacting a component of D, such as a precursor which contains one or two groups —SO$_2$—X and one or two groups of the formula (3a) with a second component of D, such as a precursor, in a manner known per se, for example by means of a coupling reaction or by means of a condensation reaction and, if appropriate, carrying out a metallization, during these reactions or subsequently, by means of a metal-donating agent in analogy to known process methods.

Examples of such precursors for the organic dye molecules are known diazo components and coupling components, 1-amino-4-bromo-anthraquinone-2-sulfonic acid compounds, aromatic or aliphatic primary or secondary amines, phthalocyanine-sulfochlorides, aminophenol compounds and aminobenzoic acid compounds; in the literature, numerous starting compounds of this type for the manufacture of water-soluble dye molecules known per se are known and their reaction properties are described.

The manufacturing method according to the invention by reaction of the above compounds of the general formula (2) with a compound of the general formula (3) is preferably carried out in an aqueous solution at a temperature between 0° and 50° C., especially between 15° and 20° C., and at a pH value between 4 and 8, preferably between 5 and 7. The manufacturing method according to the invention of reacting the above compounds of the general formula (2) with cyanuric fluoride is preferably carried out in an aqueous, neutral to acid solution at a temperature between 0° and 20° C., preferably at 0° to 5° C., and at a pH value of 4 to 6; the subsequent reaction of the difluorotriazinyl compound with the amine of the formula (5) is preferably carried out in an aqueous, neutral to acid solution at a temperature between 0° and 50° C., preferably between 10° and 40° C.

Examples of preferred compounds according to the invention, corresponding to the general formula (1), are monoazo compounds and disazo compounds, in which the formula moiety D represents a radical of the formulae (6), (7), (8) or (9):

 —A—N=N—K$_1$— (6)

 —K$_2$—N=N—A$_x$— (7)

 —A—N=N—T—N=N—K$_1$— (8a)

 —A—N=N—K—N=N—A$_x$— (8b)

 —K$_2$—N=N—E—N=N—K$_1$— (9).

These formula moieties have the following meanings:

A as the radical of a diazo component is a phenylene radical which can be substituted by substituents, preferably 1 or 2 substituents, which are customary in azo chemistry and which are preferably taken from the group comprising lower alkyl, such as methyl and ethyl, lower alkoxy, such as methoxy and ethoxy, carboxy, optionally substituted lower alkanoylamino, such as preferably acetylamino, optionally substituted benzoylamino, such as preferably benzoylamino and sulfobenzoylamino, phenylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, fluorine, trifluoromethyl, hydroxy and sulfo, or A is a naphthylene radical which can be substituted by substituents, preferably 1 or 2 substituents, which are customary in azo chemistry and which preferably are taken from the group comprising sulfo, carboxy, methyl, ethyl, methoxy, ethoxy, optionally substituted lower alkanoylamino, such as preferably acetylamino, optionally substituted benzoylamino, such as preferably benzoylamino, and sulfobenzoylamino, chlorine, hydroxy or nitro; moreover, A can also be substituted by a phenylazo radical or naphthylazo radical, in which case the phenyl radical thereof can be substituted by 1 or 2 substituents of the group comprising lower alkyl, lower alkoxy, carboxy, acetylamino, benzoylamino, carbamoyl, sulfamoyl, cyano, nitro, chlorine, bromine, trifluoromethyl, sulfo and the above-indicated group —SO$_2$—X, and the naphthyl radical thereof can be substituted by 1, 2 or 3 sulfo groups or by 1 or 2 sulfo groups and the above-indicated group —SO$_2$—X;

A$_x$ can have the various meanings given for A (it being possible for A$_x$ to be identical to or different from A), but with the difference that the above-mentioned monofluorotriazinylamino radical (in place of the abovementioned group —SO$_2$—X) is bonded to A$_x$;

K is the bivalent radical of a bivalent coupling component, such as, for example, a coupling component from the phenol, resorcinol, phenylenediamine, dihydroxynaphthalene or aminonaphthol series, preferably the 1-hydroxy-8-amino-naphth-2,7-ylene radical or 1-amino-8-hydroxy-naphth-2,7-ylene radical, which can be substituted by 1 or 2 sulfo groups in the 3-, 5- and 6-position or, respectively in the 3-, 4- and 6-position;

K$_1$ is the radical of a coupling component from the benzene, naphthalene or ketomethylene series and can be substituted by substituents customary in azo chemistry, particularly preferably by hydroxy, amino, methyl, ethyl, methoxy or ethoxy groups, optionally substituted lower alkanoylamino groups, optionally substituted benzoylamino groups and/or halogen atoms; preferably, K$_1$ as the radical of a coupling component is a 1-hydroxy- or 2-hydroxy-naphthylene radical which can be substituted by 1 or 2 sulfonic acid groups, or K$_1$ is the 1-amino- or 2-amino-naphthylene radical or the naphthylene radical, which can be substituted by 1 or 2 sulfonic acid groups and/or one hydroxy group, or K$_1$ is the radical 5-aminopyrazol-4-yl or 5-pyrazolon-4-yl, which are substituted in the 3-position by methyl, carboxy, carbamoyl, lower carbalkoxy, such as carbomethoxy and carbethoxy, or phenyl, and are substituted in the 1-position by phenyl or naphthyl, it being possible for the phenyl radical to be substituted by 1 or 2 sulfonic acid groups and/or 1 or 2 substituents from the group comprising lower alkyl, lower alkoxy, chlorine, bromine, nitro, optionally substituted lower alkanoylamino, such as acetylamino, optionally substituted benzoylamino and carboxyl, and for the naphthyl radical to be substituted by 1, 2 or 3 sulfo groups and/or one substituent from the group comprising lower alkyl, lower alkoxy, nitro, optionally substituted lower alkanoylamino, such as acetylamino, optionally substituted benzoylamino and carboxy, the fluorotriazinylamino radical being bonded to this phenyl or naphthyl radical, or K$_1$ as the radical of a coupling component is the bivalent acetoacetylanilide or acetoacetylnaphthylamide radical, in which case the phenyl radical can be substituted by 1 or 2 substituents taken from the group comprising lower alkyl, such as methyl and ethyl, lower alkoxy, such as methoxy and ethoxy, carboxy, optionally substituted lower alkanoylamino, such as acetylamino, optionally substituted benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, fluorine, trifluoromethyl and sulfo, and the naphthyl radical can be substituted by 1 or 2 substituents from the group comprising sulfo, carboxy, methyl, methoxy, ethoxy, chlorine, hydroxy or nitro, the fluorotriazinylamino radical being bonded to the phenyl or naphthyl radical, or K$_1$ is the radical of a coupling component from the 6-hydroxy-pyridone-(2) series or K$_1$ is a p-phenylene radical which can be substituted by 1 or 2 substituents from the group comprising lower alkyl, lower alkoxy and chlorine or by a dimethylamino, diethylamino, ureido or acetylamino group;

K$_2$ can have the various meanings given for K$_1$ (it being possible for K$_2$ to be identical to or different from K$_1$), but with the modification that one or two groups of the formula —SO$_2$—X (in place of the said monofluorotriazinylamino radical) are bonded to the aromatic moiety of K$_2$;

T is the bivalent radical of a middle component which, in the synthesis of the compounds, can serve first as a coupling component and then as a diazo component and denotes a phenylene radical, which can be substituted by a substituent from the group comprising lower alkyl, lower alkoxy, chlorine, optionally substituted lower alkanoylamino, such as acetylamino, optionally substituted benzoylamino, amino, methylamino, ethylamino, dimethylamino, diethylamino and ureido, or denotes a naphthylene radical which is substituted by an amino or hydroxy group in the ortho-position or para-position relative to the first azo group and can be substituted by a lower alkyl, nitro or acetylamino group and/or by 1 or 2 sulfonic acid groups, or T denotes the radical of the formula

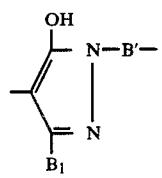

in which $B_1$ represents the methyl or carboxy group and B' denotes a phenylene or naphthylene radical which can also be substituted by 1 or 2 substituents from the group comprising sulfo, carboxy, lower alkyl, lower alkoxy and chlorine;

E is a phenylene radical which can be substituted by a sulfo or methyl group or is the radical of the formula

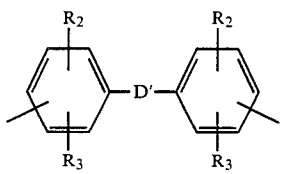

in which D' is a direct bond or represents the group —NH—CO—, —CO—NH—, —CO—, —SO$_2$—, —CH=CH—, —N=N—, —O— or —CH$_2$—, $R_2$ is a hydrogen atom or a lower alkyl group, such as a methyl or ethyl group, a lower alkoxy group, such as a methoxy or ethoxy group, a chlorine or bromine atom or a sulfonic acid group and $R_3$ represents a hydrogen atom, a lower alkyl group, such as a methyl or ethyl group, a lower alkoxy group, such as a methoxy or ethoxy group, or a chlorine or bromine atom, and, in these formula moieties (6) to (9), the groups of the formulae —SO$_2$—X and of the formula (3a) can be bonded each separately to A, $A_x$, $K_1$ and $K_2$ or, if appropriate, also simultaneously to these radicals and, in the disazo compounds, the group of the formula —SO$_2$—X can also be bonded to the radical T, the formula moieties A, $A_x$, K, $K_1$, $K_2$, T and E containing preferably two or more, particularly preferably three or four, sulfonic acid groups in total.

Coupling components which contain the radical $K_1$ and which can be employed in the synthesis for the preparation of the abovementioned mono- or dis-azo compounds according to the invention, are, for example, compounds of the general formulae (10a), (10b), (10c), (10d), (10e), (10f), (10g), (10h) and (10j);

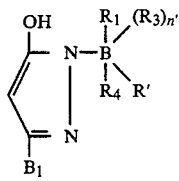 (10a)

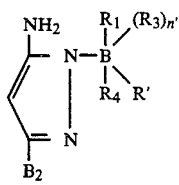 (10b)

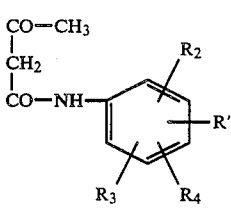 (10c)

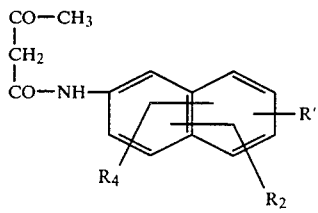 (10d)

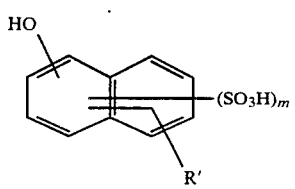 (10e)

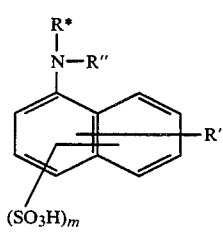 (10f)

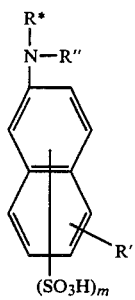 (10g)

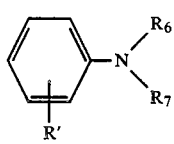 (10h)

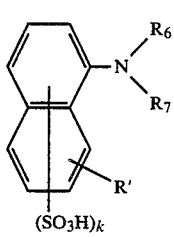 (10j)

In these formulae:

R' is a radical of the formula (X—SO$_2$)$_n$— with X and n having the abovementioned meanings, or it is a monofluorotriazinylamino radical of the formula (3a) designated above, preferably with p=1;

$R_1$ is a hydrogen atom, a lower alkyl group, such as, in particular, a methyl or ethyl group, a lower alkoxy group, such as, in particular, a methoxy or ethoxy group, a chlorine or bromine atom, a lower alkanoylamino group, such as an acetylamino group, or a sulfonic acid group;

$R_2$ is a hydrogen atom, a lower alkyl group, such as, in particular, a methyl or ethyl group, a lower alkoxy group, such as, in particular, a methoxy or ethoxy group, a chlorine or bromine atom or a sulfonic acid group;

R₃ is a hydrogen atom, a lower alkyl group, such as, in particular, a methyl or ethyl group, a lower alkoxy group, such as, in particular, a methoxy or ethoxy group, or a chlorine or bromine atom;

R₄ is a hydrogen atom, a lower alkyl group, such as, in particular, a methyl or ethyl group, a lower alkoxy group, such as, in particular, a methoxy or ethoxy group, or a sulfonic acid or carboxylic acid group, it being possible for R₁, R₂, R₃ and R₄ to be mutually identical or different;

n' is the number 1 or 2;

B is a benzene or naphthalene nucleus;

B₁ is a lower alkyl group, preferably a methyl group, a carboxyl group, a carbomethoxy or carboethoxy group or a phenyl radical;

B₂ is a lower alkyl group, preferably a methyl group, a carbomethoxy or carboethoxy group, a carbonamide group or a phenyl radical which can be substituted by 1 or 2 substituents from the group comprising lower alkyl, lower alkoxy, chlorine, bromine and sulfo, it being possible for R₁, R₃, R₄ and B₁ or B₂ to be mutually identical or different;

R* is a hydrogen atom or lower alkyl radical;

R" is a hydrogen atom, a lower alkyl radical or a phenyl radical which can be substituted by 1 or 2 substituents from the group comprising lower alkyl, lower alkoxy, chlorine, bromine and sulfo, it being possible for R* and R" to be mutually identical or different;

k is the number zero or 1;

m represents the number zero, 1 or 2;

R₆ is a hydrogen atom or a lower alkyl group which can be substituted by a hydroxyl, cyano, carboxy, sulfo, sulfato, carbomethoxy, carboethoxy or acetoxy group;

R₇ is a hydrogen atom or a lower alkyl group which can be substituted by a hydroxy, cyano, carboxy, sulfo, sulfato, carbomethoxy, carboethoxy or acetoxy group, or is a benzyl radical or a phenyl radical which can be substituted by lower alkyl, lower alkoxy, chlorine and/or sulfo;

R₈ is a hydrogen atom or a lower alkyl group, such as a methyl or ethyl group, or a lower alkyl group substituted by lower alkoxy or cyano; and R₉ is a hydrogen atom, a lower alkyl group, such as a methyl group, a lower sulfoalkyl group, such as a sulfomethyl group, a cyano group or a carbonamido group, it being possible for R₁, R₆, R₇, R₈ and R₉ to be mutually identical or different.

Aromatic amines which can be employed as the diazo components for the preparation of the dyes according to the invention and which contain the formula moiety A in the above formulae (6) to (8), are, for example, compounds of the formulae (10k) and (10m):

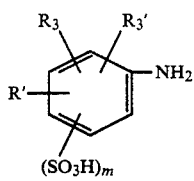
(10k)

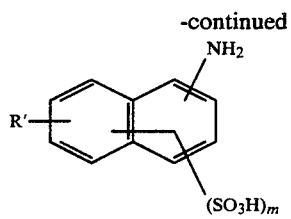
(10m)

In these formulae, the forula moieties R', R₂, R₃ and m have the meanings given above and R₃' is a hydrogen atom, a lower alkyl group, such as, in particular, a methyl or ethyl group, a lower alkoxy group, such as, in particular, a methoxy or ethoxy group, a chlorine or bromine atom or a hydroxy group, it being possible for R₃ and R₃' to be mutually identical or different.

Compounds which can be employed both as the diazo component and as the coupling component for the preparation of the disazo dyes according to the invention and which contain the formula moiety T of formula (8), are, for example, compounds of the general formulae (11a), (11b), (11c), (11d), (11e), (11f), (11) and (11h):

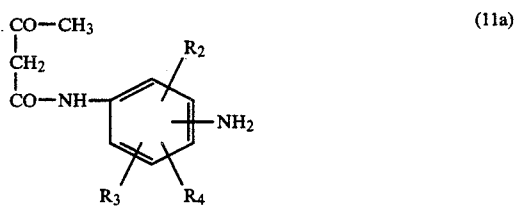
(11a)

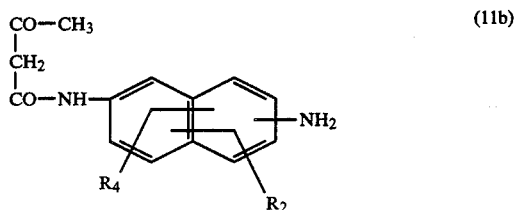
(11b)

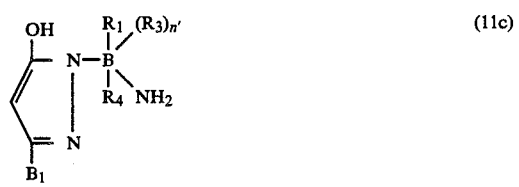
(11c)

(11d)

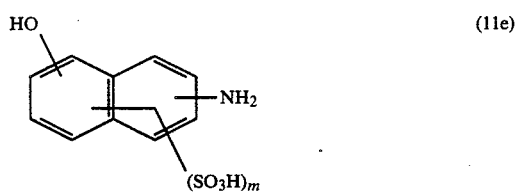
(11e)

-continued

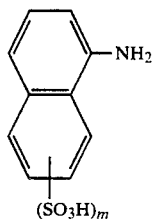
(11f)

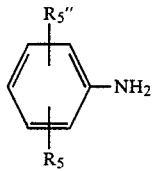
(11g)

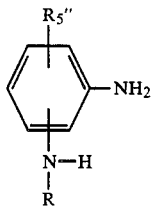
(11h)

in which B, $B_1$, $B_2$, $R_1$, $R_2$, $R_3$, $R_4$, m and n' have the meanings given above and $R_5$ is a hydrogen atom, a lower alkyl group, such as a methyl or ethyl group, a lower alkoxy group, such as a methoxy or ethoxy group, or a chlorine or bromine atom, and $R_5''$ represents a hydrogen atom, a lower alkyl group, such as a methyl or ethyl group, a lower alkoxy group, such as a methoxy or ethoxy group, a chlorine or bromine atom, a lower alkanoylamino group, such as an acetylamino group, or an amino, ureido, lower alkylsulfonylamino, lower alkylamino or lower dialkylamino group.

Aromatic diamines which do not contain an fiber-reactive group and can be used as tetrazo components for the preparation of the disazo dyes according to the invention and which contain, for example, the formula moiety E of formula (9), for example, compounds of the general formula (12)

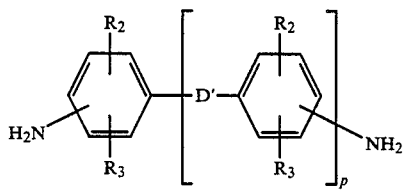
(12)

in which $R_2$, $R_3$ and D' have the meanings given above and p represents the number zero or 1.

Valuable compounds according to the invention, corresponding to the general formula (1), are also the heavy metal complex compounds of the abovementioned monoazo and disazo compounds, for example those corresponding to the general formulae (13a), (13b) and (13c)

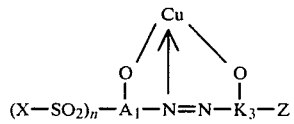
(13a)

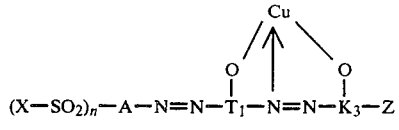
(13b)

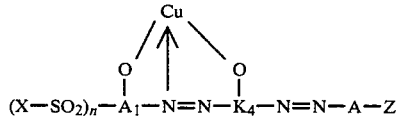
(13c)

and their corresponding 1:2 chromium complex and 1:2 cobalt complex derivatives. In these formulae: A, X and n have the meanings given above;

$A_1$ is a benzene nucleus which can be substituted by 1 or 2 substituents taken from the group comprising lower alkyl, such as methyl and ethyl, lower alkoxy, such as methoxy and ethoxy, carboxy, phenylamino, sulfobenzoylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or $A_1$ is a naphthalene nucleus which can be substituted by 1, 2 or 3 sulfonic acid groups and/or by a carboxy, methyl, methoxy, ethoxy, nitro or acetylamino group or a chlorine atom, the complex-forming oxygen atom in $A_1$ being bonded in the ortho-position relative to the azo group, and $K_3$ is a naphthalene nucleus which can be substituted by 1 or 2 sulfonic acid groups, or $K_3$ is the radical pyrazol-4-ylene or pyrazol-5-ylene, which are substituted in the 3-position by methyl, carboxy, carbamoyl, lower carbalkoxy, such as carbomethoxy and carboethoxy, or phenyl, and are substituted by phenyl or naphthyl in the 1-position, it being possible for the phenyl radical to be substituted by 1 or 2 sulfonic acid groups and/or 1 or 2 substituents from the group comprising lower alkyl, lower alkoxy, chlorine, bromine, nitro, acetylamino and carboxy, and for the naphthyl radical to be substituted by 1, 2 or 3 sulfo groups and/or a substituent from the group comprising lower alkyl, lower alkoxy, nitro, acetylamino and carboxy, or $K_3$, as the radical of a coupling component, represents the acetoacetylanilide or acetoacetylnaphthylamide radical, in which case the phenyl radical can be substituted by 1 or 2 substituents taken from the group comprising lower alkyl, such as methyl and ethyl, lower alkoxy, such as methoxy and ethoxy, carboxyl, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, and the naphthyl radical can be substituted by 1 or 2 substituents from the group comprising sulfo, carboxy, methyl, methoxy, ethoxy, chlorine, hydroxy or nitro, the complex-forming oxygen atom in K₃ being bonded in the ortho-position relative to the azo group;

T₁, as a middle component which, in the synthesis of the dyes, served initially as a coupling component and then as a diazo component, represents a benzene nucleus which can be substituted by substituents from the group comprising lower alkyl, lower alkoxy, chlorine, acetylamino, dimethylamino, diethylamino and ureido, or T₁ represents a naphthalene nucleus which can be substituted by lower alkyl, nitro, acetylamino or sulfo, or the radical of the formula

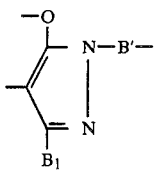

in which B₁ and B' have the meanings given at the outset and the complex-forming oxygen atoms in T₁ and K₃ are bonded in the ortho-position relative to the azo group;

K₄, as the radical of the bifunctional coupling component aminonaphthol, represents a naphthylene radical, which can contain one or two sulfo groups and in which the complex-forming oxygen atom is bonded in the ortho-position relative to the azo group; and Z represents the radical of the formula (3a) defined above.

Aromatic amines and coupling components which are suitable for the preparation of the abovementioned metal complex compounds and which contain these formula moieties, are, for example, the initially mentioned compounds of the general formulae (10) and (11), in which case the aromatic diazo components have, in the ortho-position relative to the diazotizable amino group, a hydroxy group, or have a hydrogen atom or a lower alkoxy group which can be converted to the hydroxy group by an oxidative coppering reaction or dealkylating coppering reaction, respectively.

Aromatic amines which can be used as the diazo components for the preparation of the monoazo or disazo compounds and which contain one or two groups of the formula —SO₂—X, are for example: aniline-4-β-sulfatoethylsulfone, aniline-4-β-thiosulfatoethylsulfone, aniline-4-vinylsulfone, aniline-4-β-chloroethylsulfone, aniline-3-β-sulfatoethylsulfone, aniline-3-vinylsulfone, 2-methoxy-aniline-5-β-sulfatoethylsulfone, 2-methoxyaniline-5-β-thiosulfatoethylsulfone, 2-methoxyaniline-5-vinylsulfone, 4-methoxy-aniline-3-β-sulfatoethylsulfone, 4-methoxy-aniline-3-β-vinylsulfone, 2,5-dimethoxy-aniline-4-β-sulfatoethylsulfone, 2,5-dimethoxyaniline-4-vinylsulfone, 2,5-dimethoxy-aniline-4-β-sulfatoethylsulfone, 2-methoxy-5-methyl-aniline-4-β-sulfatoethylsulfone, 2-methoxy-5-methyl-aniline-4-β-vinylsulfone, 6-carboxy-aniline-3-β-sulfatoethylsulfone, 6-carboxyaniline-3-vinylsulfone, 2-sulfoaniline-4-β-sulfatoethylsulfone, 2-sulfoaniline-4-vinylsulfone, 2,4-disulfoaniline-5-vinylsulfone, 2-hydroxyaniline-5-β-sulfatoethylsulfone, 2-hydroxy-aniline-4-β-sulfatoethylsulfone, 3-sulfo-2-hydroxy-aniline-5-β-sulfatoethylsulfone, 2-naphthylamine-8-β-sulfatoethylsulfone, 2-naphthylamine-6-β-sulfatoethylsulfone, 1-sulfo-2-naphthylamine-6-β-sulfatoethylsulfone, 6-sulfo-2-naphthylamine-8-β-sulfatoethylsulfone, 2-aminonaphthalene-6,8-di-(β-sulfatoethylsulfone), 2-bromo-1-aminobenzene-4-β-sulfatoethylsulfone and 2,6-dichloro-1-aminobenzene-4-β-sulfatoethylsulfone.

Aromatic amines which can be used as the diazo components in the synthesis of the monoazo or disazo compounds according to the invention and which contain the monofluorotriazinyl radical, are, for example, the compounds of the following formulae:

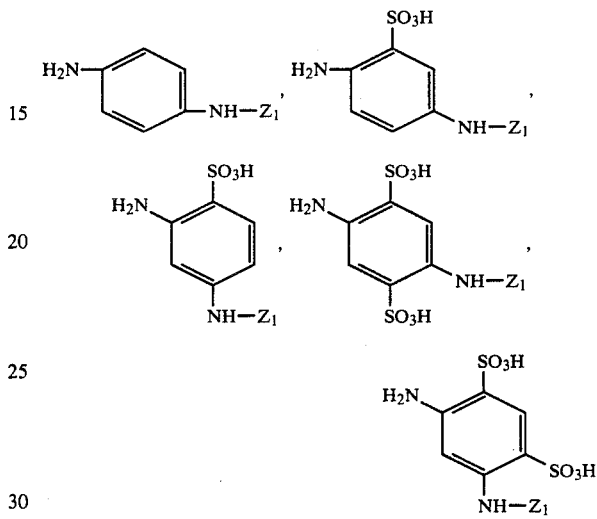

in which Z₁ represents the radical of the formula (3b)

(3b)

in which Y has the meaning given at the outset.

Aromatic monoamines and diamines which can be used as the bifunctional component (diazo component and coupling component) in the preparation of the disazo compounds according to the invention, are for example: aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-naphthylamine-6-β-sulfatoethylsulfone, 1-naphthylamine-7-β-sulfatoethylsulfone, 1,3-diaminobenzene, 1,3-diamino-4-methyl- or -methoxy-benzene, 1,3-diamino-benzene-4-sulfonic acid, 1-aminophthalene, 1-aminonaphthalene-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-N-acetoacetylamino-4-aminobenzene, 1-N-acetoacetylamino-4-N-methyl-aminobenzene, 1-N-acetoacetylamino-3-methyl-4-aminobenzene, 1-N-aceto-acetylamino-3-methoxy-4-aminobenzene, 4-amino-3-sulfoacetoacetylanilide, 1-(3'-aminophenyl)-3-methylpyrazol-5-one, 1-(4'-aminophenyl)-3-methylpyrazol-5-one, 1-(3'- or -4'-aminophenyl)-3-carboxypyrazol-5-one, 1-(3'-sulfo-4'-aminophenyl)-3-carbethoxy-pyrazol-5-one, 1-(3'-amino-4'-sulfo-phenyl)-3-carboxy-pyrazol-5-one, 1-(2',4',6'-trimethyl-3'-amino-5'- sulfo-phenyl)-3-carbethoxy-pyrazol-5-one, 1-(4'-aminophenyl)-3-methyl-pyrazol-5-one and 1-(3'-amino-6'-methyl-phenyl)-3-carboxypyrazol-5-one.

Aromatic diamines which can be used as the tetrazo components for the preparation of the compounds according to the invention are, for example: 1,3-diaminobenzene, 1,3-diaminobenzene-4-sulfonic acid, 1,4-diaminobenzene, 1,4-diaminobenzene-2-sulfonic acid, 1,4-diamino-2-methyl-benzene, 1,4-diamino-2-methoxybenzene, 1,3-diamino-4-methyl-benzene, 1,3-diaminobenzene-5-sulfonic acid, 1,3-diamino-5-methyl-benzene, 1,6-diamino-naphthalene-4-sulfonic acid, 2,6-diamino-4,8-disulfo-naphthalene, 3,3'-diamino-diphenylsulfone, 4,4'-diamino-diphenylsulfone, 3,3'-diamino-diphenylsulfone-disulfonic acid, 4,4'-diaminostilbene-2,2'-disulfonic acid, 4,4'-diamino-diphenylsulfone, 2,7-diamino-diphenylenesulfone-4,5-disulfonic acid, 4,4'-diamino-benzophenone, 4,4'-diamino-3,3'-dinitro-benzophenone, 3,3'-diamino-4,4'-dichloro-benzophenone, 4,4'- or 3,3'-diamino-diphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro- or -3,3'-diethoxy-diphenyl, 4,4'-diamino-3,3'-dimethyl-6,6'-dinitro-diphenyl, 4,4'-diamino-2,2'- or -3,3'-disulfodiphenyl, 4,4'-diamino-3,3'-dimethyl- or -3,3'-dimethoxy- or -2,2'-dimethoxy-6,6'-disulfo-diphenyl, 4,4'-diamino-2,2',5,5'-tetrachlorodiphenyl, 4,4'-diamino-3,3'-dinitro-diphenyl, 4,4'-diamino-2,2'-dichloro-5,5'-dimethoxy-diphenyl, 4,4'-diamino-2,2'- or -3,3'-dicarboxylic acid, 4,4'-diamino-3,3'-dimethyl-diphenyl-5,5'-disulfonic acid, 4,4'-diamino-2-nitro-diphenyl, 4,4'-diamino-3-ethoxy- or -3-sulfo-diphenyl, 4,4'-diamino-3,3'-dimethyl-5-sulfo-diphenyl, 4,4'-diaminodiphenylmethane, 4,4'-diamino-3,3'-dimethyldiphenylmethane, 4,4'-diamino-2,2'3,3'-tetramethyl-diphenylmethane, 4,4'-diamino-diphenylethane, 4,4'-diaminostilbene, 4,4'-diamino-diphenylmethane-3,3'-dicarboxylic acid and 1,2-di-(4'-aminophenoxy)-ethane.

Examples of coupling components which can be contained in the monoazo or disazo dyes according to the invention or are used for the preparation thereof, are in particular the compounds of the formulae:

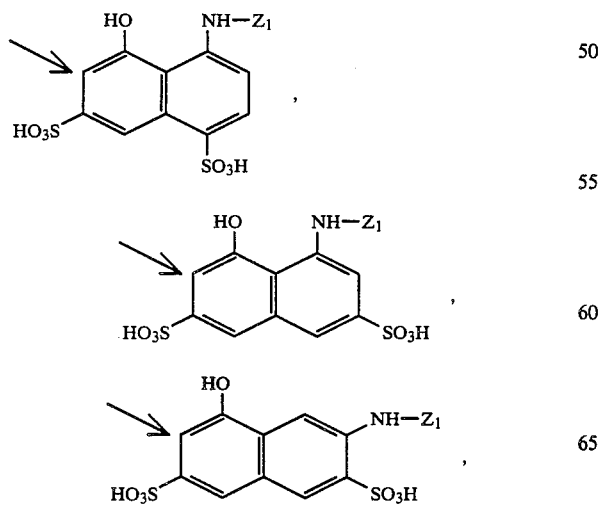

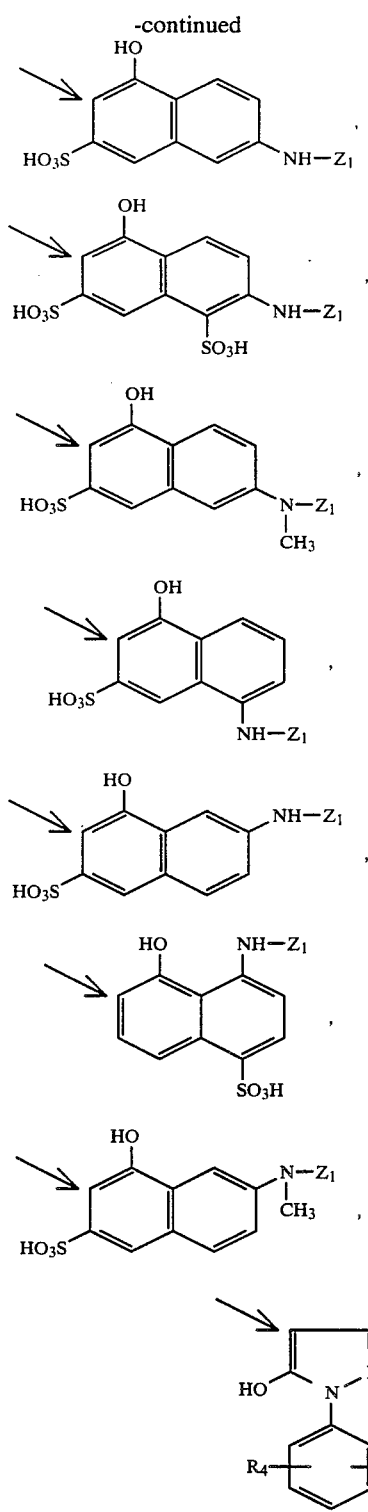

wherein $R_4$ has the meaning given above and $Z_1$ represents the radical of the general formula (3b), as given above and defined.

For the preparation of the monoazo and disazo compounds according to the invention, and also of their metal complex dyes, a conventional procedure can be followed in which, for example, the diazotized aromatic amines are reacted with the coupling components, analogously to the known diazotizing and coupling methods, and these azo compounds are, if appropriate, converted by subsequent metallization into the corresponding heavy metal complex compounds, such as the copper, cobalt or chromium complex compounds, analogously to known procedures (see Houben-Weyl, "Methoden der Organischen Chemie [Methods of Organic Chemistry]", 4th edition, (1965), Volume 10/3, pages 452 et seq.; Angewandte Chemie 70, 232-238 (1958); Angewandte Chemie 64, 397 (1952)). However, it is also possible to proceed, for example, by diazotizing an aromatic amine which, for example, contains one or two groups of the formula $-SO_2X$, and coupling it with a coupling component which still possesses a free amino group which can be acylated. The azo compound thus prepared can then, as indicated above, be reacted with a difluorotriazine derivative of the formula (3).

Further preferred and valuable compounds according to the invention, corresponding to the general formula (1), are, for example, the metal-containing phthalocyanine compounds which correspond to the general formulae (14) and (15) (both are written in the form of the free acids):

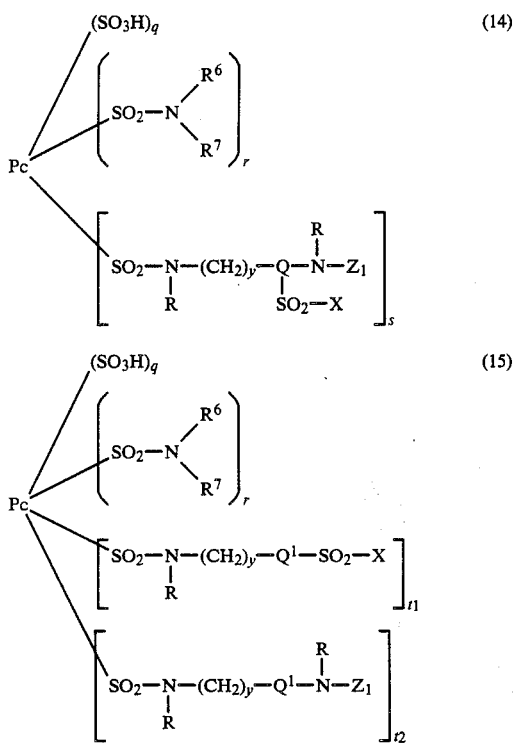

in which
Pc represents the radical of copper phthalocyanine or nickel phthalocyanine, the sulfo groups and sulfonamido groups being bonded to the phthalocyanine radical in the 3-position or 4-position,
$R^6$, $R^7$ and R are identical or different and each represent a hydrogen atom or an alkyl group of 1 to 4 C atoms,
y is the number zero, 1 or 2,
Q denotes the benzene or naphthalene nucleus which can additionally be substituted by 1 or 2 substituents from the group comprising methyl, ethyl, methoxy, ethoxy, chlorine, bromine, sulfo and carboxy,
$Q^1$ which can be identical or different is a phenylene or naphthylene radical which can be substituted by 1 or 2 substituents from the group comprising methyl, ethyl, methoxy, ethoxy, chlorine, bromine, sulfo and carboxy, or represent an alkylene radical having 2 to 6 C atoms,
q represents a numerical value from 0 to 3,
r represents a numerical value from 0 to 2 and
s represents a numerical value between 1 and 2 and
$t_1$ and $t_2$ which can be identical or different each represent a numerical value from 1 to 1.5, preferably 1, the sum of $(t_1+t_2)$ being at most 2.5, preferably 2, and the sum of $(q+r+s)$ or that of $(q+r+t_1+t_2)$ each being at most 4, and
R, X and $Z_1$ have the meanings given above.

These phthalocyanine compounds according to the invention can be synthesized analogously to known process methods for the preparation of phthalocyanines containing sulfo groups and sulfonamide groups, for example by reacting phthalocyanine-sulfonic acid chlorides, which may contain a sulfo group, with primary or secondary aliphatic and/or aromatic amines which contain the group of the formula $-SO_2-X$ and/or the monofluorotriazinylamino radical of the group of the general formula (3a) with p=1 or preferably, instead of the latter, an amino or acylamino radical, such as an acetylamino radical, it being possible, after the condensation reaction of the phthalocyanine-sulfochloride with the amino compounds to introduce the fluorotriazinyl radical by means of a difluorotriazine compound of the general formula (3), corresponding to the above indicated process method (a). For example, the above phthalocyanine compounds corresponding to the general formulae (14) and (15) and prepared by a method in which a compound of the general formula (16)

in which v represents a number between 0 and 2 and w represents a number between 2 and 4, the sum of (v+w) being at most 4, is reacted with a diamino compound of the general formula (17) or with a monoacyl derivative thereof, of the general formula (17a)

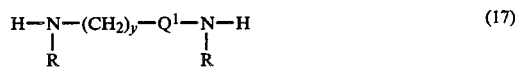

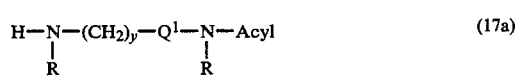

in which R, $Q^1$ and y have the meanings given above and Acyl denotes an acyl radical, preferably an acetyl radical, and is further reacted, simultaneously, or in any desired sequence, with a second amino compound of the general formula (18)

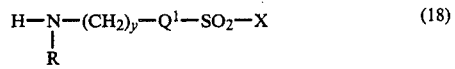

in which R, $Q^1$, X and y have the meanings given above, or a compound of the above formula (16) is reacted with an amino compound of the general formula (19) or (19a)

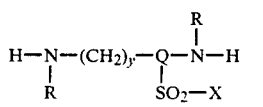

(19)

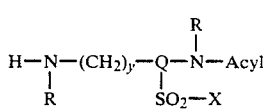

(19a)

in which y, R, Q, X and Acyl have the meanings given above, and in all the process methods described, the products can be reacted, simultaneously or in any desired sequence, with yet a further amine of the general formula —NR$^6$R$^7$ in which R$^6$ and R$^7$ have the meanings given above. The compounds prepared in this way and corresponding to the general formula (14) or (15) in which the formula moieties have the meanings given for these formulae, with the exception of the meaning of $Z_1$ which here is a hydrogen atom or an acyl radical, are then subjected to a further reaction, by means of which the monofluorotriazinyl radical of the formula (3a) defined above is introduced. If at this stage the compounds are of a type in which $Z_1$ represents an acyl radical, the acylamino radical in these compounds is selectively hydrolyzed to the amino radical analogously to known process methods (compare Venkataraman, Reactive Dyes (1972), page 320). The present compounds corresponding to the formula (14) or (15), in which $Z_1$ here represents a hydrogen atom, are then reacted with the difluorotriazinyl compound of the formula (3) in accordance with the process method (a) indicated at the outset.

The compounds of the general formulae (14) and (15) can also be prepared by a method in which a compound of the formula (16) defined above is reacted with a compound of the general formula (20)

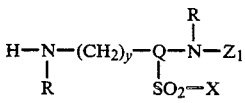

(20)

in which R, Q, X, $Z_1$ and y have the meanings given above, and, if appropriate, are reacted, simultaneously or in any desired sequence, with an amine of the formula —NR$^6$R$^7$ defined above.

The condensation reaction of the phthalocyaninesulfochlorides with the various amines is carried out at a pH value from about 4 to 8, preferably up to 7, and at a temperature between about 0° and 40° C. and in the presence of an acid-binding agent and in the presence of pyridine or a pyridine-carboxylic or -sulfonic acid as a catalyst. Preferably, the reaction is carried out in an aqueous medium. Care must be taken in this reaction that an alkaline pH range is avoided, if the starting compounds used in this condensation reaction contain a β-sulfatoethylsulfonyl or β-thiosulfatoethylsulfonyl or a monofluorotriazine radical. The analogous known process method is described, for example, in German Offenlegungsschrift No. 2,824,211.

If the starting compounds used in the above condensation reaction are those of the general formulae (18), (19), (19a) or (20) in which the formula moiety X represents the β-hydroxyethyl group, the compounds obtained as intermediates in the condensation reaction are those of the formula (14) or (15) in which $Z_1$ here represents a hydrogen atom, and it is thus advantageous first to convert the β-hydroxyethyl group representing X in the conventional manner, preferably by means of concentrated sulfuric acid, into the β-sulfatoethyl group and then, after this esterification, to carry out the acylation of the amino group, in aqueous solution, by means of the compound of the formula (3).

Further valuable compounds according to the invention, corresponding to the general formula (1) are anthraquinone compounds of the general formulae (21) and (22), written in the form of the free acid

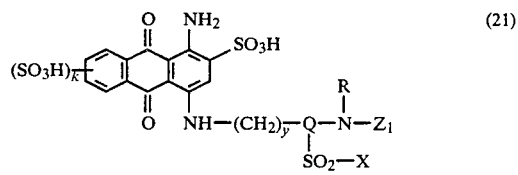

(21)

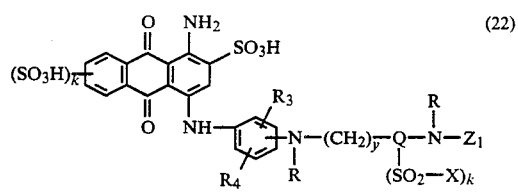

(22)

in which R, R$_3$, R$_4$, y, Q, X and $Z_1$ have the meanings given above and wherein Q preferably is a benzene nucleus which can be substituted, preferably by a sulfo, carboxy or lower alkoxy group, and R$_3$ preferably denotes a hydrogen atom and R$_4$ preferably denotes a hydrogen atom or a sulfo, carboxy or lower alkoxy group, and wherein the k which can be mutually identical or different each represent the number zero or 1, and R$_4$ can also denote the above-defined radical of the formula —SO$_2$—X. As already mentioned at the outset, the anthraquinone compounds according to the invention can also be obtained by reacting 4-bromo-1-aminoanthraquinone-2-sulfonic acid, analogously to known process methods, with the corresponding amines of the general formulae (23) and (23a)

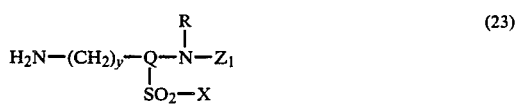

(23)

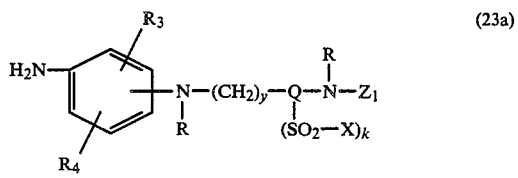

(23a)

in which R$_3$, R$_4$, R, y, Q, X and k have the meanings given above and $Z_1$ represents a hydrogen atom, the above-defined acyl radical or the above-defined radical of the formula (3b). The reaction is preferably carried out in an aqueous medium and in the presence of copper/copper salts as a catalyst.

The anthraquinone compounds according to the invention can also be prepared in such a way that, for example, an anthraquinone of the general formulae (24) or (24a)

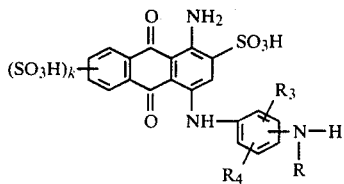

(24)

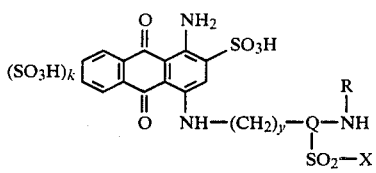

(24a)

in which k, R, R₃, R₄, y, Q and X have the meanings given here, is first reacted by the above-indicated process method (b) according to the invention with cyanuric fluoride to give a difluorotriazinyl compound and is then subsequently allowed to react with an amine of the above-defined formula (5), which preferably contains the defined radical of the formula —SO₂—X.

If the starting compounds used for the preparation of these anthraquinone compounds according to the invention contain a β-hydroxyethylsulfonyl group and an amino group or acylamino group (which, if necessary after hydrolysis, are reacted with a fluorotriazine radical), it is also advantageous first to esterify these anthraquinone intermediates, in accordance with the instructions for the abovementioned, corresponding phthalocyanine compounds, with sulfuric acid to give the β-sulfatoethylsulfonyl compounds and subsequently to acylate the latter with the fluorotriazine derivative to give the compounds according to the invention, corresponding to the formula (1).

Examples of compounds corresponding to the general formula (19) or (19a), which can be used for the synthesis of the above compounds, for example those of the general formula (14) or (21), are 1,3-diaminobenzene-4-β-hydroxyethylsulfone, 2,4-diaminotoluene-5-β-hydroxyethylsulfone, 2,6-diamino-toluene-4-β-hydroxyethylsulfone, 1,4-diaminobenzene-2-β-hydroxyethylsulfone, 2,5-diaminotoluene-4-β-hydroxyethylsulfone and 1,3,5-trimethyl-2,4-diaminobenzene-6-β-hydoxyethylsulfone.

Examples of further valuable compounds according to the invention, corresponding to the general formula (1), are copper-formazan compounds corresponding to the general formula (25)

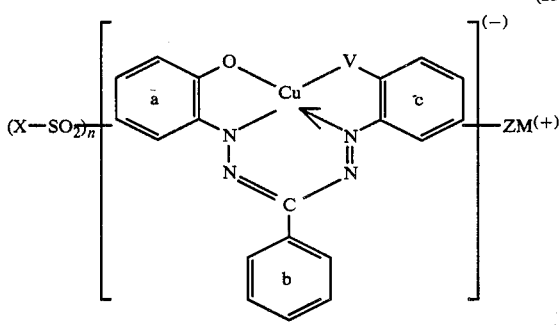

(25)

In this formula:
the phenylene nucleus a is unsubstituted or it can be substituted by substituents, preferably 1 or 2 substituents, from the group comprising sulfo, carboxy, halogen, such as fluorine, chlorine and bromine, acetylamino, nitro, alkyl having 1 to 5 C atoms, such as isopropyl, tert.-butyl, tert.-amyl or isobutyl, in particular methyl and ethyl, alkoxy having 1 to 4 C atoms, such as methoxy and ethoxy, alkylsulfonyl having 1 to 4 C atoms, such as methylsulfonyl and ethylsulfonyl, phenylsulfonyl, sulfamoyl, N-monoalkylsulfamoyl and N,N-dialkylsulfamoyl having in each case 1 to 4 C atoms in the alkyl;

the phenyl nucleus b is unsubstituted or it can be substituted by substituents, preferably 1 to 2 substituents, from the group comprising sulfo, carboxy, hydroxyl, nitro, halogen, such as fluorine, bromine and chlorine, alkyl having 1 to 5 C atoms, preferably methyl and ethyl, alkoxy having 1 to 4 C atoms, preferably methoxy and ethoxy, acetylamino, alkylsulfonyl having 1 to 4 C atoms, sulfamoyl, N-monoalkylsulfamoyl and N,N-dialkylsulfamoyl having 1 to 4 C atoms in each case, and carbalkoxy having 1 to 4 C atoms in the alkyl radical, such as carbomethoxy and carbethoxy;

the phenyl nucleus c is unsubstituted or it can be substituted by substituents, preferably 1 or 2 substituents, from the group comprising sulfo, carboxy, halogen, such as fluorine, chlorine and bromine, acetylamino, nitro, alkyl having 1 to 5 C atoms, such as isopropyl, tert.-butyl, tert.-amyl or isobutyl, in particular methyl and ethyl, alkoxy having 1 to 4 C atoms, such as methoxy and ethoxy, alkylsulfonyl having 1 to 4 C atoms, such as methylsulfonyl and ethylsulfonyl, phenylsulfonyl, sulfamoyl and N-monoalkylsulfamoyl and N,N-dialkylsulfamoyl having 1 to 4 C atoms in the alkyl in each case;

V is an oxygen atom or an oxycarbonyl group of the formula —O—OC—;

M is a hydrogen atom or the equivalent of a metal, preferably an alkali metal, or one equivalent of an alkaline earth metal, such as, in particular, sodium or potassium or one equivalent of calcium;

the formula moieties X and n have the meanings given at the outset;

Z has the above-defined meaning of the general formula (3) with p=1 or 2;

the formula moiety Z can be a substituent on a, b and c, which is additional to the abovementioned substituents of a, b and c and of which one or two, bonded to an aromatic carbon atom of these benzene nuclei, must necessarily be contained in the formazan molecule; and the formula moiety —SO₂—X can be a substituent on a, b and c, which is additional to the abovementioned substituents of a, b and c and of which one or two, bonded to an aromatic carbon atom of these benzene nuclei, must necessarily be contained in the formazan molecule.

Those formazan compounds of the general formula (25) are preferred in which the phenylene radical a is unsubstituted or is substituted by 1 or 2 substituents from the group comprising sulfo, carboxy, methyl, ethyl, methoxy, ethoxy, nitro, chlorine and bromine, the phenylene radical b is unsubstituted or is substituted by 1 or 2 substituents from the group comprising sulfo, carboxyl, methyl, ethyl, methoxy, ethoxy, nitro, chlorine and bromine, and the phenylene radical c is unsubstituted or is substituted by 1 or 2 substituents from the group comprising sulfo, carboxy, methyl, ethyl, methoxy, ethoxy, nitro, chlorine and bromine, it being absolutely necessary in each case for 1 or 2 groups of the formulae —$SO_2$—X and Z to be present as, if appropriate, additional substituents on a, b and c, on these benzene nuclei a and/or b and/or c, and X preferably representing a β-sulfatoethyl group, V representing an oxygen atom and $M^{(+)}$ being a sodium or potassium ion.

The formazan compounds according to the invention can be prepared analogously to known methods by reacting the corresponding aminophenol and/or aninobenzoic acid derivatives and benzaldehyde derivatives in the presence of copper salts. Such process methods are described, for example, in German Offenlegungsschriften Nos. 1,719,083, 1,961,714 and 2,364,764. Accordingly, the starting materials here are corresponding ortho-aminophenol and/or ortho-aminobenzoic acid compounds and benzaldehyde compounds, which contain a group of the above-defined formula —$SO_2$—X with X preferably being a β-hydroxyethyl group or an amino group of the formula —N(R)—H, with R having the meaning given above, or an acyl derivative thereof. The copper-formazan compounds, which occur as intermediates and contain these amino groups or acylamino groups and β-hydroxyethyl sulfone groups, are initially converted into the corresponding amino derivatives, with hydrolysis of the acylamino group. These compounds, in the same way as also in the preparation of the above phthalocyanine and anthraquinone compounds, are isolated, dried and then esterified in the indicated manner to give the β-sulfatoethylsulfonyl compound, are then reacted in an aqueous, neutral to weakly acid solution with the fluorotriazinyl derivative of the general formula (3) or with cyanuric fluoride and are subsequently reacted with an amine of the formula (5) to give the compound according to the invention, corresponding to the general formula (1) or (25). The esterification of the β-hydroxyethylsulfonyl group can, for example, be carried out in sulfuric acid according to the method described in Example 2 of German Offenlegungsschrift No. 1,719,083. Preferably, the esterification to give the β-sulfatoethylsulfonyl group is also carried out by the process methods known from German Offenlegungsschrift No. 2,016,862 and Patent Specification No. 2,634,909.

Amongst the abovementioned compounds according to the invention, those corresponding to the general formulae (a) to (z) below can also be singled out:

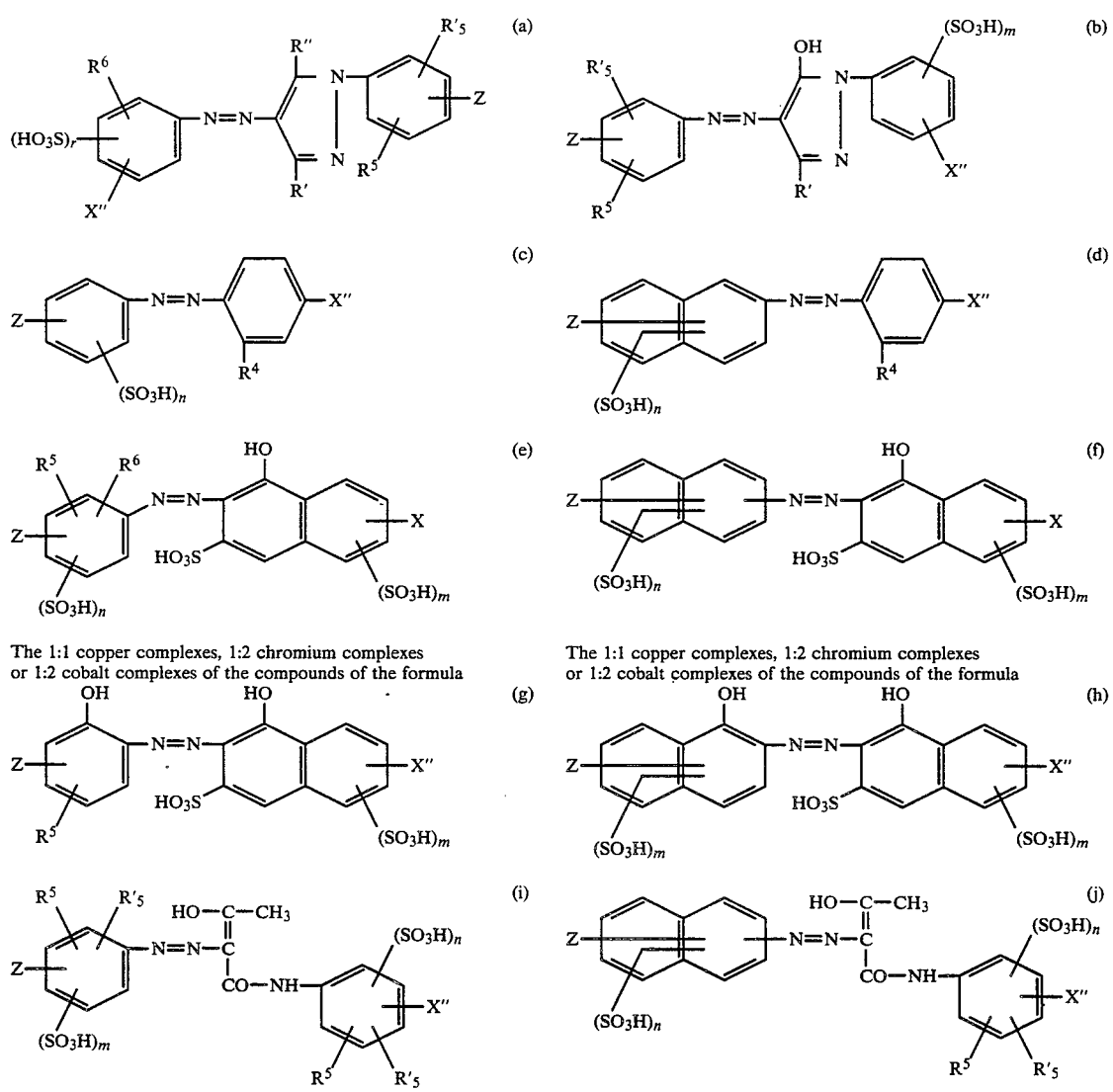

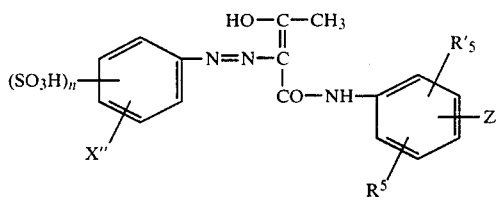 (k)
The 1:1 copper complexes, 1:2 chromium complexes or 1:2 cobalt complexes of the compounds of the formula
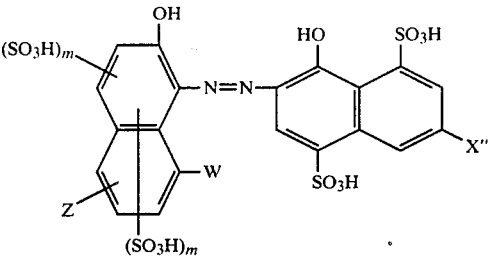 (l)
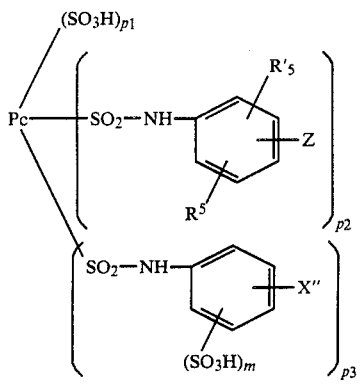 (m)
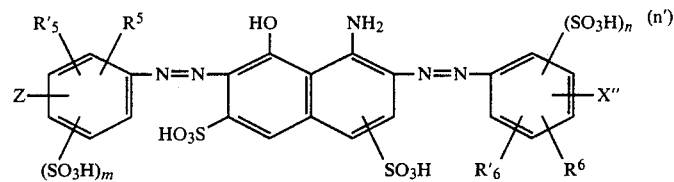 (n')
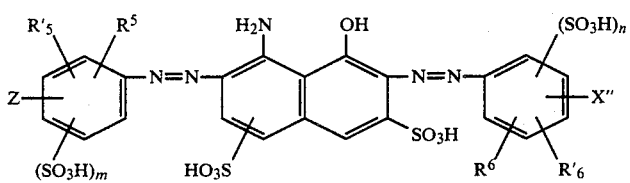 (n")
The 1:1 copper complexes, 1:2 chromium complexes or 1:2 cobalt complexes of the compounds of the formula
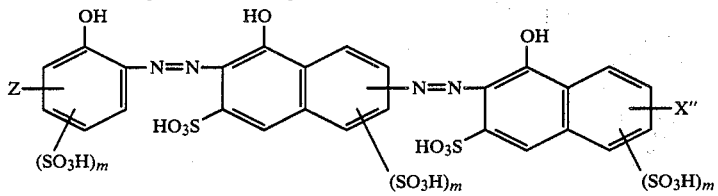 (o)
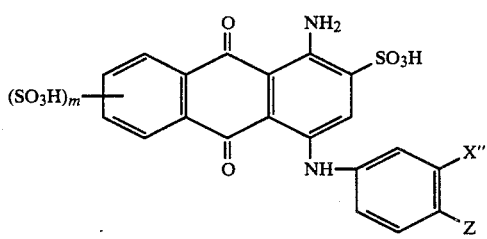 (p)
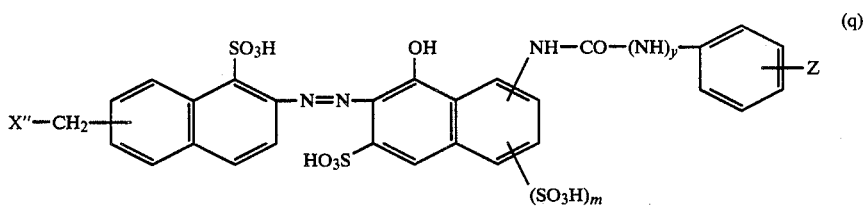 (q)

-continued
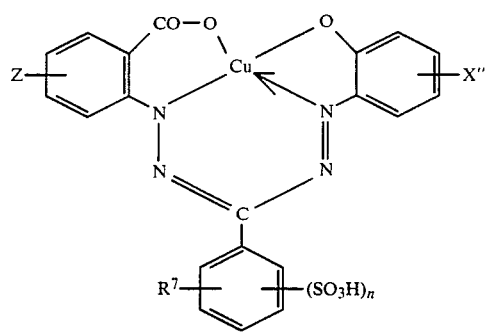 (r')
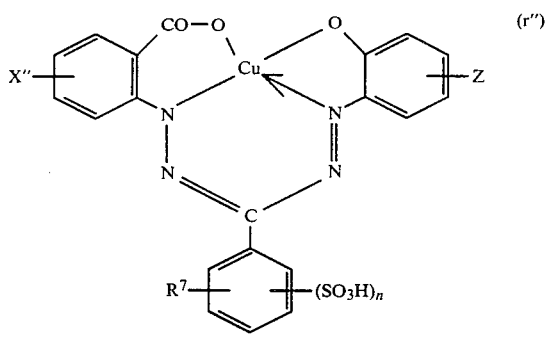 (r")
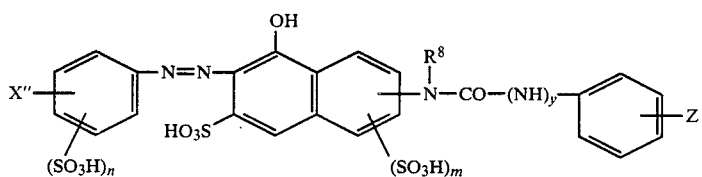 (s)
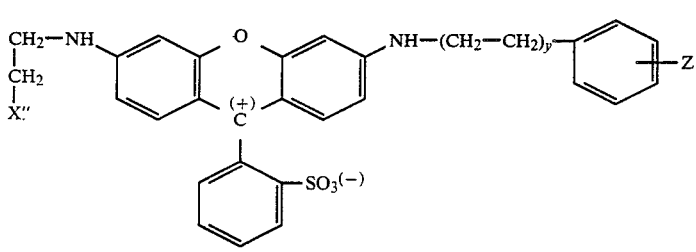 (t)
The 1:1 copper complexes, 1:2 chromium complexes or 1:2 cobalt complexes of the compounds of the formula
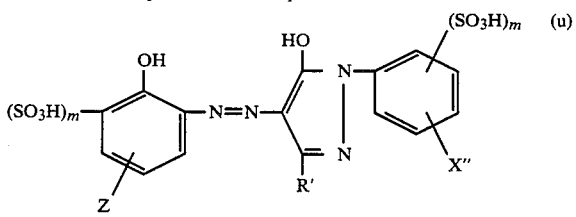 (u)
The 1:1 copper complexes, 1:2 chromium complexes or 1:2 cobalt complexes of the compounds of the formula
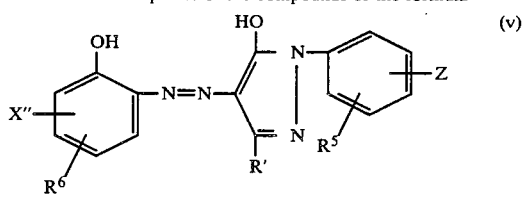 (v)
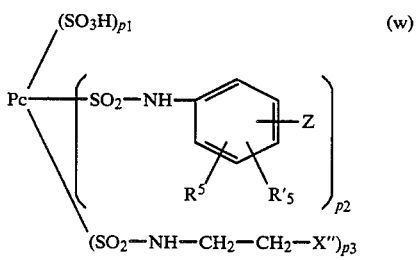 (w)
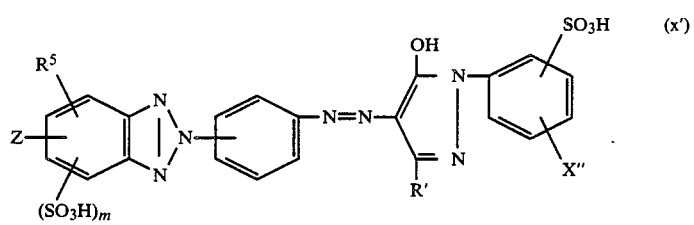 (x')
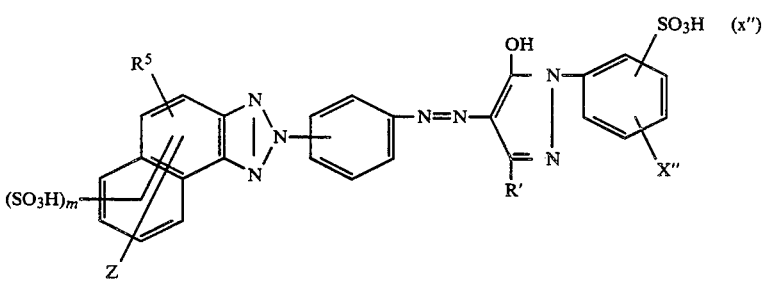 (x")

-continued

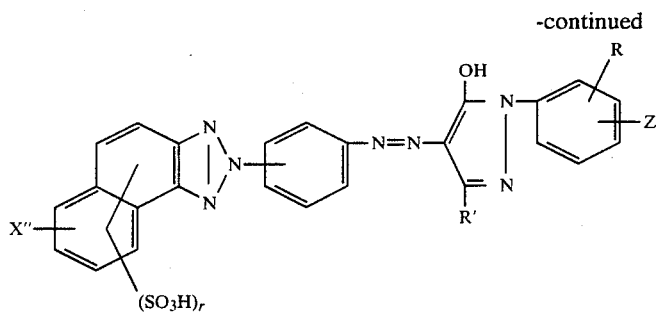

The 1:1 copper complexes, 1:2 chromium complexes or 1:2 cobalt complexes of the compounds of the formula

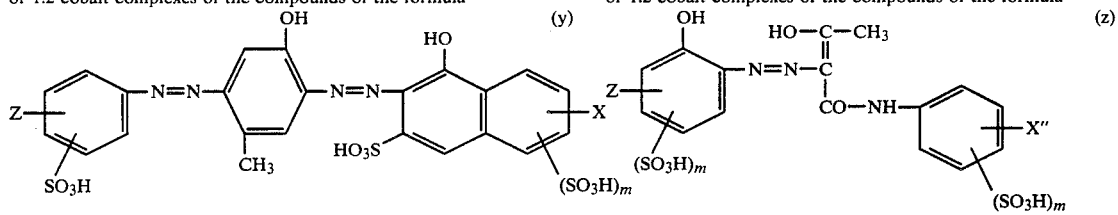

In these formulae:

X is a group of the general formula (3a) with R and Y having the meanings given above, R preferably being hydrogen or methyl, and p being 1;

X" is a group of the general formula (3a) with R being hydrogen, p being 1 and Y having the above meanings;

Z is here vinylsulfonyl, β-thiosulfatoethylsulfonyl, β-sulfatoethylsulfonyl or β-chloroethylsulfonyl;

m is the number zero or 1, this group representing a hydrogen atom in the case of m=zero;

n is the number zero, 1 or 2, this group representing a hydrogen atom in the case of n=zero;

$p_1$, $p_2$ and $p_3$ which can be mutually identical or different each are a number from 1 to 2, the sum of ($p_1+p_2+p_3$) being at most 4;

r is the number 1 or 2;

y is the number zero or 1;

R' is a methyl, carboxy, carbomethoxy or carbethoxy group;

R" is an amino or hydroxy group;

$R^4$ is an amino, acetylamino or ureido group;

$R^5$ is a hydrogen atom or a methyl, methoxy, ethyl, ethoxy, hydroxy or carboxy group;

$R_5'$ is a hydrogen atom or a methyl, methoxy, ethyl, ethoxy, hydroxy or carboxy group;

$R^6$ is a hydrogen or chlorine atom or a methyl, methoxy, ethyl, ethoxy, hydroxy or carboxy group;

$R_6'$ is a hydrogen or chlorine atom or a methyl, methoxy, ethyl, ethoxy, hydroxy or carboxy group;

$R^7$ is a hydrogen or chlorine atom;

$R^8$ is a hydrogen atom or a methyl group;

W is a hydrogen atom or a hydroxy group;

Pc is a metal-free or metal-containing phthalocyanine radical, preferably a copper- or nickel-phthalocyanine radical; and the formula moieties R', R", $R^4$, $R^5$, $R_5'$, $R^6$, $R_6'$, $R^7$, $R^8$, Y and W and also m, n, $p_1$, $p_2$, $p_3$, r and y can be mutually identical or different, Amongst the compounds of the general formula (1), the monoazo compounds and copper complex azo compounds described in Examples 1, 4, 71, 72, 76, 82 and 85 can be especially singled out (the compound according to the invention, described in Example 85 of the Table has the following chemical formula, described in the form of the free acid:

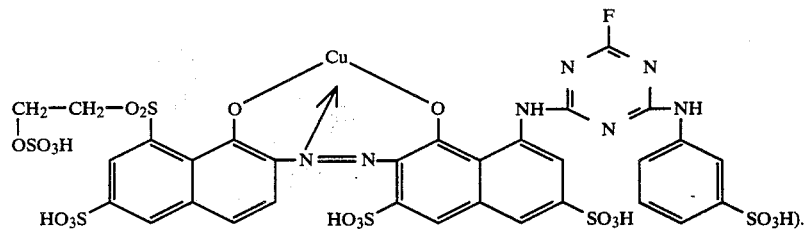

The separation of the compounds, prepared according to the invention, from the synthesis batches is carried out by generally known methods, either from precipitation from the reaction medium by means of electrolytes, such as, for example, sodium chloride or potassium chloride, or by evaporation of the reaction solution, for example by spray-drying, it being possible for a buffer substance to be added to this reaction solution. The new compounds according to the invention, of the general formula (1), have fiber-reactive properties and possess very good dye properties. They can therefore be used for dyeing material containing hydroxy groups and/or carbonamide groups, in particular fiber material, and also leather. Likewise, the solutions obtained in the synthesis of the compounds according to the invention, if appropriate after the addition of a buffer substance and, if appropriate, after concentrating, can be employed directly as liquid preparations in dyeing.

The present invention therefore also relates to the use of the compounds according to the invention, of the general formula (1), for dyeing materials containing hydroxy groups and materials containing carbonamide groups, and to processes for their use on these substrates. This includes bulk dyeing, for example of polyamide sheets or films, and dyeing by printing.

Preferably, the materials are employed in the form of fiber materials, in particular in the form of textile fibers, such as yarns, wound packages and fabrics.

Materials containing hydroxy groups are natural or synthetic materials containing hydroxy groups, such as, for example, cellulose fiber materials or regeneration products thereof, and polyvinyl alcohols. Cellulose fiber materials are preferably cotton, and also other vegetable fibers, such as linen, hemp, jute and ramie fibers; examples of regenerated cellulose fibers are staple rayon and viscose rayon.

Materials containing carbonamide groups are, for example, synthetic and natural polyamides and polyurethanes, especially in the form of fibers, for example wool and other animal hairs, silk, leather, Polyamide 6.6, Polyamide 6, Polyamide 11 and Polyamide 4.

The compounds according to the invention can be applied, and fixed, to the said substrates, in particular the said fiber materials, by the application techniques known for water-soluble dyes, in particular for fiber-reactive dyes.

Thus, by the exhaustion processes from long liquor with the use of an acid-binding agent and, if appropriate, neutral salts, such as sodium chloride or sodium sulfate, they give very good color yields and an excellent color build-up on cellulose fibers. Dyeing is carried out in an aqueous bath at temperatures between 40° and 105° C., if appropriate at a temperature of up to 120° C. and under pressure, and if appropriate in the presence of conventional dyeing auxiliaries. A possible procedure here is to introduce the material into the warm bath and to heat the latter gradually to the desired dyeing temperature and to complete the dyeing process at this temperature. The neutral salts which accelerate the exhaustion of the dye can, if desired, also be added to the bath only after the actual dyeing temperature has been reached.

The padding process likewise gives excellent color yields and a very good color build-up on cellulose fibers and, in this case, fixation can be carried out by leaving the material to stand at room temperature or at an elevated temperature, for example up to about 60° C., by steaming or by means of dry heat in the conventional manner.

The conventional printing processes for cellulose fibers likewise give deep prints with well-defined outlines and a clear white ground; these processes can be carried out either in a one-phase method, e.g. by printing with a printing paste which contains sodium bicarbonate or another acid-binding agent and the coloring agent, and by subsequent steaming at 100° to 103° C., or they can be carried out in a two phases method, e.g. by printing with a neutral or weakly acid printing paste which contains the coloring agent, and subsequent fixation either by passing the printed goods through a hot alkaline bath containing an electrolyte, or by overpadding with an alkaline padding liquor containing an electrolyte, and subsequently leaving this treated material to stand, or subsequently steaming it or subsequently treating it with dry heat. The resulting quality of the prints depends only to a small extent on varying fixation conditions. Both in dyeing and in printing, the degrees of fixation of the compounds according to the invention are very high.

When fixing by means of dry heat by the conventional thermofixing processes, hot air of 120° to 200° C. is used. In place of conventional steam at 101° to 103° C., it is also possible to use superheated steam and pressure steam having temperatures of up to 160° C.

Examples of acid-binding agents which effect the fixing of the dyes on the cellulose fibers are water-soluble basic salts of the alkali metals and alkaline earth metals with inorganic or organic acids, and also compounds which liberate alkali under the action of heat.

In particular, alkali metal hydroxides and alkali metal salts of weak to moderately strong inorganic or organic acids should be mentioned; amongst the alkali metal compounds, this preferably means the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass or trisodium phosphate.

The compounds according to the invention (dyes) are chemically bonded to the cellulose fiber by the treatment of the compounds according to the invention with the acid-binding agent, if appropriate under the action of heat; after the conventional after-treatment by rinsing in order to remove portions of the dye which have not been fixed, especially the dyeings on cellulose show excellent fastness to wet processing, particularly since portions of dye which have not been fixed can be readily washed out because of their good solubility in cold water.

Dyeings on polyurethane fibers and polyamide fibers are usually carried out with the use of an acid medium. Thus, for example, acetic acid and/or ammonium sulfate and/or acetic acid and ammonium acetate or sodium acetate can be added to the dyebath in order to obtain the desired pH value. For the purpose of achieving useful levelness of the dyeing, an addition of conventional leveling aids is advisable, such as, for example, those based on a reaction product of cyanuric chloride with three times the molar quantity of an aminobenzenesulfonic acid and/or an aminonaphthalenesulfonic acid and/or those based on a reaction product of, for example, stearylamine with ethylene oxide. As a rule, the material to be dyed is introduced into the bath at a temperature of about 40° C. and is kept in motion therein for some time, the dyebath is then readjusted to the desired weakly acid pH value, preferably by means of acetic acid, and the actual dyeing is carried out at a temperature between 60° and 98° C. The dyeings can, however, also be carried out at the boiling point or at temperatures of up to 120° C. (under pressure).

The dyeings and prints produced with the compounds according to the invention, of the general formula (1), are distinguished by very clear shades. In particular, the dyeings and prints on cellulose fiber materials have good depth, as already mentioned, and furthermore good lightfastness and very good fastness to wet processing, such as fastness to washing, milling, water, seawater, cross-dyeing and perspiration, and furthermore good fastness to pleating, ironing and rubbing.

The high fixation yields which can be achieved with the dyes according to the invention on cellulose fiber materials and which, in the case of application by printing processes and pad-dyeing processes, can be up to 90% and, in individual cases, more than 90%, should be especially singled out. A further advantage of the dyes according to the invention is the fact that the proportion of dye, which has not been fixed during the printing or dyeing step, can be readily washed out, so that the step of washing the printed or dyed cellulose fiber materials can be accomplished with small quantities of wash liquor and, if desired, an energy-saving temperature program during the washing step. As a rule, with respect to the fixation yield on cellulose fiber materials and with respect to the behavior on washing-out of the portion of dye which has not been fixed, the dyes according to the invention are superior to those most closely comparable reactive dyes which contain, as the reactive group, only one monofluorotriazine radical or only one vinylsulfone group bonded to the dye molecule.

The examples which follow serve to illustrate the invention. The parts quoted therein are parts by weight and percentage data represent percent by weight, unless otherwise stated. Parts by weight have the same relationship to parts by volume as the kilogram to the liter.

EXAMPLE 1

64 parts of 1-amino-8-naphthol-3,6-disulfonic acid are dissolved in 800 parts of water with the addition of 15 parts of sodium carbonate at a pH of 4.5 to 5.0. The solution is then cooled to 0° C. and 28 parts of cyanuric fluoride are added dropwise, during which the pH value falls and is maintained at pH 3 to 4 by sprinkling in sodium bicarbonate powder. The mixture is stirred for a further 15 minutes at pH 3 to 4 and at 0° C., and a solution of the sodium salt of 38 parts of aniline-3-sulfonic acid is then added. The mixture is stirred at a pH value of 5 for 5 hours at 20° to 25° C., until free amine is no longer detectable by the diazotization test. The solution is used as the coupling component for the preparation of the dye.

To prepare the diazonium compound, 56 parts of aniline-4-β-sulfatoethylsulfone are suspended in 500 parts of ice water, and the suspension is acidified with 45 parts of concentrated aqueous hydrochloric acid and diazotized with 40 parts by volume of 5N sodium nitrite solution. The mixture is stirred for a further 2 hours at about 5° C. and excess nitrous acid is then destroyed by means of amidosulfonic acid. The diazonium salt solution thus prepared is allowed to run slowly, at a pH value of 5.5 to 6.0, into the solution of the coupling component. The mixture is stirred for a further 2 hours until the coupling is complete. The pH value is maintained at 5.5 to 6 by adding sodium bicarbonate. The dye is then precipitated with sodium chloride, isolated on a suction filter and, after admixing 7 parts of disodium phosphate, dried in vacuo at 60° C. After grinding, a red dye powder, which contains electrolyte, is obtained which contains the sodium salt of the compound of the formula

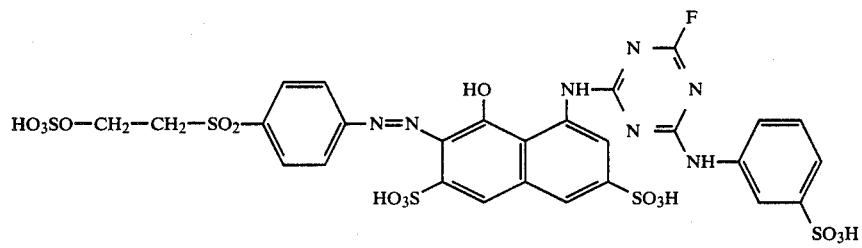

This compound possesses very good dye properties and dyes cellulose materials, by the conventional dyeing and printing processes for reactive dyes, in clear, bluish-tinged red shades with very good fastness to wet processing.

EXAMPLE 2

A diazonium salt solution is prepared; initially 72 parts of 4-β-sulfatoethylsulfonylaniline-2-sulfonic acid are dissolved in 400 parts of water with the addition of 16 parts of sodium carbonate, the solution is then cooled to 0° to 5° C., acidified with 50 parts of concentrated aqueous hydrochloric acid and diazotized with a solution of 40 parts by volume of 5N sodium nitrite solution. Excess nitrous acid is then destroyed with a little amidosulfonic acid. This solution is then allowed to run into the solution of the coupling component which was prepared according to Example 1. During this, the pH value is maintained at 4 to 4.5 by sprinkling in sodium bicarbonate. The mixture is stirred for a further 2 hours and the pH value is then adjusted to 6.5 with disodium phosphate. The dye solution is evaporated to dryness at 60° C. in vacuo. After grinding, a red dye powder containing electrolyte is obtained, and this contains the sodium salt of the compound of the formula

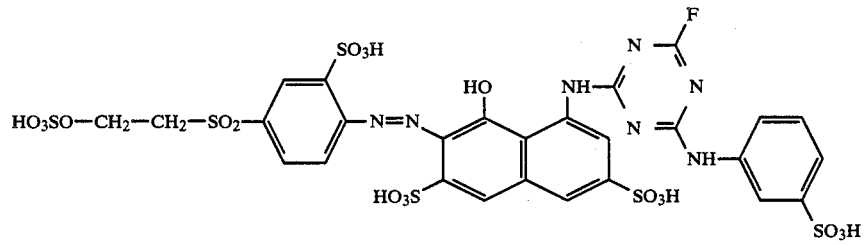

This azo compound is outstandingly suitable as a dye. Due to the fiber-reactive properties, deep red dyeings having a bluish-tinged hue, which are very resistant to the action of light and to washing treatments, are obtained on cotton, for example, from an aqueous-alkaline liquor.

EXAMPLE 3

60 parts of 3-β-thiosulfatoethylsulfonyl-aniline are introduced into 400 parts of water and are brought into solution by careful addition of 16 parts of sodium bicarbonate. 150 parts of ice and 50 parts of concentrated aqueous hydrochloric acid are then added and 40 parts by volume of 5N sodium nitrite solution are allowed to run in. The mixture is stirred for a further 2 hours at 0° to 5° C. and excess nitrous acid is then destroyed by means of amidosulfonic acid.

To this diazonium salt suspension, a solution of a primary condensation product is slowly added at 15° C. and at a pH value of 4 to 5 which is adjusted by simultaneous addition of a saturated sodium bicarbonate solution, said solution of the primary condensation product of 1-amino-8-naphthol-4,6-disulfonic acid and cyanuric fluoride is prepared as follows: 64 parts of 1-amino-8-naphthol-4,6-disulfonic acid are stirred into 400 parts of water and brought into solution by the addition of 7 parts of sodium carbonate. Subsequently, the mixture is cooled to 0° C. and 28 parts of cyanuric fluoride are added dropwise. During this, the pH value falls; it is maintained at 4 to 4.5 by dropwise addition of a cooled saturated sodium bicarbonate solution. After a further stirring period of ½ hour, there are no longer any diazotizable components present in the solution. The diazonium salt is then added, and coupling takes place at 10° to 15° C. During this, the pH value is maintained at 4 to 5 by dropwise addition of a saturated bicarbonate solution. After a further stirring period of 1 hour, a neutral solution is added which is obtained by dissolving 19 parts of aniline-3-sulfonic aicd, 19 parts of aniline-4-sulfonic acid and 8 parts of sodium carbonate in 200 parts of water. The mixture is stirred for a further 6 hours at 20° to 25° C. and at pH 5.5 to 6.0.

The dye is precipitated by means of sodium chloride, isolated on a suction filter and, after the addition of 5 parts of phosphate powder, dried in a vacuum drying oven at 40° to 50° C. After grinding, a red dye powder is obtained which contains the sodium salt of the compound of the formula

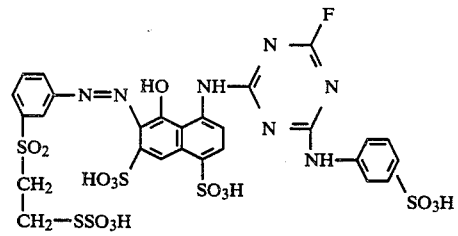

Using the conventional exhaustion or padding processes, this azo compound gives yellowish-tinged red dyeings on cotton or wool fibers from an aqueous-alkaline or weakly acid liquor respectively. The dyeings have very good washfastness and lightfastness.

EXAMPLE 4

62 parts of 2-methoxy-5-β-sufatoethylsulfonylaniline are introduced into 200 parts of water and brought into solution by the addition of 15 parts of sodium bicarbonate. The solution is cooled to 0° to 5° C., 45 parts of concentrated hydrochloric acid are added and diazotization is carried out by the dropwise addition of 40 parts by volume of 5N sodium nitrite solution. The mixture is stirred for 1 further hour and excess nitrous acid is then destroyed with a little amidosulfonic acid.

The diazonium salt obtained is combined with the aqueous solution of the coupling component which was prepared as follows: 37 parts of aniline-3-sulfonic acid are introduced into 200 parts of water and dissolved by means of sodium carbonate. After cooling to 0° C., 28 parts of cyanuric fluoride are added dropwise and, during this, the pH value is maintained at 6.5 by sprinkling in sodium bicarbonate. The mixture is stirred for a further ½ hour and a solution obtained by dissolving 51 parts of 2-methylamino-5-naphthol-7-sulfonic acid and 12 parts of sodium carbonate in 200 parts of water is then allowed to run in. The reaction solution is then stirred for 5 hours at 15° C. to 20° C., while maintaining the pH value at pH 5.5 to 6.0 by introducing sodium bicarbonate.

This solution is then used for the preparation of the dye. Coupling is completed at 10° to 15° C. and at a pH value of 6.0 to 6.8, and the dye is precipitated with sodium chloride, isolated on a suction filter, mixed with a phosphate buffer and dried at 60° C. in a vacuum drying oven. After grinding, a red dye powder is obtained which contains the sodium salt of the compound of the formula

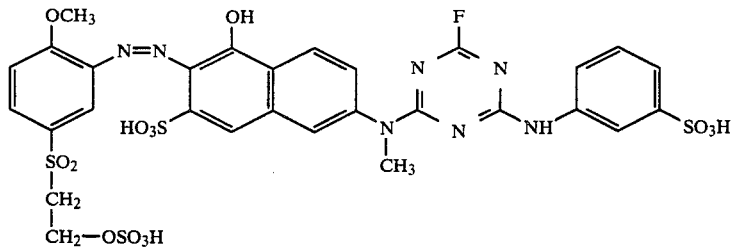

This dyestuff yields clear red shades with a yellowish-tinged hue on cotton or wool fibers by the conventional dyeing and printing processes.

EXAMPLE 5

30.3 parts of 2-naphthylamine-4,8-disulfonic acid are suspended in 400 parts by volume of ice water. 25 parts by weight of concentrated hydrochloric acid are added and the mixture is diazotized with 20 parts by volume of 5N sodium nitrite. The mixture is stirred for 1 further hour at 0° to 5° C. and excess nitrous acid is then destroyed with a little amidosulfonic acid. 33.1 parts of 1-naphthylamine-6-β-sulfatoethylsulfone are then added and the pH value is slowly raised to 4.5 by means of sodium acetate. The mixture is stirred for a further 2 hours at 10° to 15° C. at this pH value, until free diazonium compound is no longer detectable. The mixture is then cooled again to 0° to 5° C., 35 parts of concentrated hydrochloric acid and subsequently 22 parts by volume of 5N sodium nitrite solution are added. The mixture is stirred for 1 further hour at 0° to 5° C., and a little amidosulfonic acid is then added.

22.5 parts of 1-naphthylamine-8-sulfonic acid are then introduced into the solution and a pH value of 4 to 5 is established, and maintained, by means of about 15 parts of sodium carbonate, the mixture being stirred for a further 2 hours. The dye solution is then adjusted to pH 5.5 to 6.0 and cooled to 0° C. At this temperature and this pH value, 15 parts of cyanuric fluoride are first added dropwise and the mixture is stirred for a further 15 minutes, before a solution of 19 parts of aminobenzene-3-sulfonic acid and 6 parts of sodium carbonate in 150 parts by volume of water is added. The temperature is maintained at 15° C. for 1 hour and then raised to 20° C., the pH value being maintained at 5.5 to 6.0.

With the addition of 7 parts of disodium phosphate, the dye is isolated from the solution by means of potassium and sodium chloride. After dyring at 40° to 50° C. and grinding, a black dye powder is obtained which contains the alkali metal salt of the compound of the formula

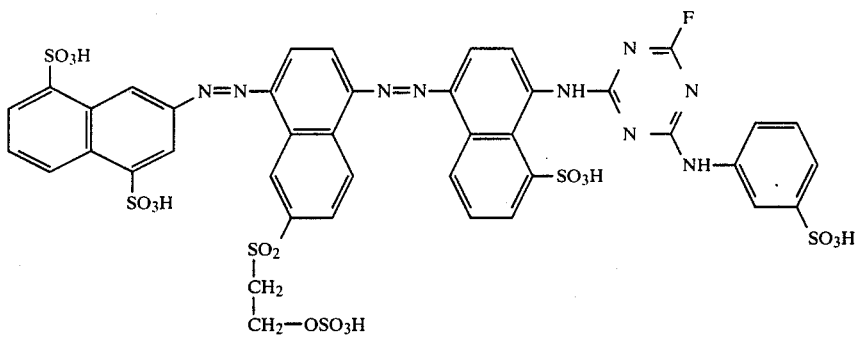

This compound possesses very good dye properties and dyes cotton and wool, by means of the conventional dyeing and printing methods for reactive dyes, in brown shades having very good fastness to wet processing.

EXAMPLES 6 TO 70d

The procedure followed is analogous to those described in the above Examples, a corresponding quantity of the aromatic amine indicated as the diazo component, of the indicated coupling component and of the amine introduced by condensation and corresponding to a compound of the formula H-Y being employed in the corresponding Examples of the Table. New valuable dyes according to the invention, which dye cotton in the color shades indicated in the tables with good fastness properties, are likewise obtained in this way.

| Example | Diazo component | Coupling component | Amine H-Y | Color shade |
| --- | --- | --- | --- | --- |
| 6 | Aniline-4-β-sulfatoethylsulfone | 1-(4',6'-Difluoro-1',3',5'-triazin-2'-yl-amino)-8-naphthol-3,6-disulfonic acid | Aminoacetic acid | red |
| 7 | Aniline-4-β-sulfatoethylsulfone | 1-(4',6'-Difluoro-1',3',5'-triazin-2'-yl-amino)-8-naphthol-3,6-disulfonic acid | Ammonia | red |
| 8 | Aniline-4-β-sulfatoethylsulfone | 1-(4',6'-Difluoro-1',3',5'-triazin-2'-yl-amino)-8-naphthol-3,6-disulfonic acid | Methylamine | red |
| 9 | Aniline-4-β-sulfatoethylsulfone | 1-(4',6'-Difluoro-1',3',5'-triazin-2'-yl-amino)-8-naphthol-3,6-disulfonic acid | Cyclohexylamine | red |
| 10 | Aniline-4-β-sulfatoethylsulfone | 1-(4',6'-Difluoro-1',3',5'-triazin-2'-yl-amino)-8-naphthol-3,6-disulfonic acid | Diethanolamine | red |
| 11 | Aniline-4-β-sulfatoethylsulfone | 1-(4',6'-Difluoro-1',3',5'-triazin-2'-yl-amino)-8-naphthol-3,6-disulfonic acid | Methoxypropylamine | red |
| 12 | Aniline-4-β-sulfatoethylsulfone | 1-(4',6'-Difluoro-1',3',5'-triazin-2'-yl-amino)-8-naphthol-3,6-disulfonic acid | 3-Acetamino propylamine | red |
| 13 | Aniline-4-β-sulfatoethylsulfone | 1-(4',6'-Difluoro-1',3',5'-triazin-2'-yl-amino)-8-naphthol-3,6-disulfonic acid | Aniline-2-carboxylic acid | red |
| 14 | Aniline-4-β-sulfatoethylsulfone | 1-(4',6'-Difluoro-1',3',5'-triazin-2'-yl-amino)-8-naphthol-3,6-disulfonic acid | Aniline-2-sulfonic acid | red |
| 15 | Aniline-4-β-sulfatoethylsulfone | 1-(4',6'-Difluoro-1',3',5'-triazin-2'-yl-amino)-8-naphthol-3,6-disulfonic acid | Aniline-4-sulfonic acid | red |
| 16 | Aniline-4-β-sulfatoethylsulfone | 1-(4',6'-Difluoro-1',3',5'-triazin-2'-yl-amino)-8-naphthol-3,6-disulfonic acid | Aniline-2,5-disulfonic acid | red |
| 17 | Aniline-4-β-sulfatoethylsulfone | 1-(4',6'-Difluoro-1',3',5'-triazin-2'-yl-amino)-8-naphthol-3,6-disulfonic acid | 1-Naphthylamine-4-sulfonic acid | red |
| 18 | Aniline-4-β-sulfatoethyl- | 1-(4',6'-Difluoro-1',3',5'- | 2-Naphthylamine-6,8- | red |

-continued

| Example | Diazo component | Coupling component | Amine H-Y | Color shade |
|---|---|---|---|---|
| | sulfone | triazin-2'-yl-amino)-8-naphthol-3,6-disulfonic acid | disulfonic acid | |
| 19 | Aniline-4-β-sulfoethyl-sulfone | 1-(4',6'-Difluoro-1',3',5'-triazin-2'-yl-amino)-8-naphthol-3,6-disulfonic acid | N—Methyl-aniline-4-sulfonic acid | red |
| 20 | Aniline-4-β-sulfoethyl-sulfone | 1-(4',6'-Difluoro-1',3',5'-triazin-2'-yl-amino)-8-naphthol-3,6-disulfonic acid | 2,3-Dimethyl-aniline | red |
| 21 | Aniline-4-β-sulfoethyl-sulfone | 1-(4',6'-Difluoro-1',3',5'-triazin-2'-yl-amino)-8-naphthol-3,6-disulfonic acid | 4-tert.-Butyl-aniline | red |
| 22 | Aniline-4-β-sulfoethyl-sulfone | 1-(4',6'-Difluoro-1',3',5'-triazin-2'-yl-amino)-8-naphthol-3,6-disulfonic acid | N,N—Dimethyl-hydrazine | red |
| 23 | Aniline-4-β-sulfoethyl-sulfone | 1-(4',6'-Difluoro-1',3',5'-triazin-2'-yl-amino)-8-naphthol-3,6-disulfonic acid | Cyanamide | red |
| 24 | Aniline-4-β-sulfoethyl-sulfone | 1-(4',6'-Difluoro-1',3',5'-triazin-2'-yl-amino)-8-naphthol-3,6-disulfonic acid | Thiourea | red |
| 25 | Aniline-4-β-sulfoethyl-sulfone | 1-(4',6'-Difluoro-1',3',5'-triazin-2'-yl-amino)-8-naphthol-3,6-disulfonic acid | Aniline-N—methane-sulfonic acid | red |
| 26 | Aniline-4-β-sulfoethyl-sulfone | 1-(4',6'-Difluoro-1',3',5'-triazin-2'-yl-amino)-8-naphthol-3,6-disulfonic acid | 4-tert.-Butyl-aniline | red |
| 27 | Aniline-4-β-sulfoethyl-sulfone | 1-(4',6'-Difluoro-1',3',5'-triazin-2'-yl-amino)-8-naphthol-3,6-disulfonic acid | 3-Amino-phenol | red |
| 28 | 2-Bromo-4-β-sulfatoethyl-sulfonyl-aniline | 1-(4',6'-Difluoro-1',3',5'-triazin-2'-yl-amino)-8-naphthol-3,6-disulfonic acid | Aniline-3-sulfonic acid | red |
| 29 | Aniline-4-vinylsulfone | 1-(4',6'-Difluoro-1',3',5'-triazin-2'-yl-amino)-8-naphthol-3,6-disulfonic acid | Aniline-4-sulfonic acid | red |
| 30 | 2,6-Dichloro-aniline-4-β-sulfatoethylsulfone | 1-(4',6'-Difluoro-1',3',5'-triazin-2'-yl-amino)-8-naphthol-3,6-disulfonic acid | 2-Chloro-phenyl-hydrazine-5-sulfonic acid | red |
| 31 | Aniline-3-β-sulfoethyl-sulfone | 1-(4',6'-Difluoro-1',3',5'-triazin-2'-yl-amino)-8-naphthol-3,6-disulfonic acid | Ammonia | red |
| 32 | Aniline-3-β-sulfoethyl-sulfone | 1-(4',6'-Difluoro-1',3',5'-triazin-2'-yl-amino)-8-naphthol-3,6-disulfonic acid | N—Methyl-amino ethane-2-sulfonic acid | red |
| 33 | Aniline-3-β-sulfoethyl-sulfone | 1-(4',6'-Difluoro-1',3',5'-triazin-2'-yl-amino)-8-naphthol-3,6-disulfonic acid | 2-Aminoethanol | red |
| 34 | Aniline-3-β-sulfoethyl-sulfone | 1-(4',6'-Difluoro-1',3',5'-triazin-2'-yl-amino)-8-naphthol-3,6-disulfonic acid | Sulfuric acid 2-amino-hydroxy-ethyl ester | red |
| 35 | Aniline-3-β-sulfoethyl-sulfone | 1-(4',6'-Difluoro-1',3',5'-triazin-2'-yl-amino)-8-naphthol-3,6-disulfonic acid | Aniline-2-sulfonic acid | red |
| 36 | Aniline-3-β-sulfoethyl-sulfone | 1-(4',6'-Difluoro-1',3',5'-triazin-2'-yl-amino)-8-naphthol-3,6-disulfonic acid | 2-Naphthylamine-4,8-disulfonic acid | red |
| 37 | 3-(N—Methyl-ethionyl-amino)-aniline | 1-(4',6'-Difluoro-1',3',5'-triazin-2'-yl-amino)-8-naphthol-3,6-disulfonic acid | Aniline-3-sulfonic acid | red |
| 38 | Aniline-3-vinylsulfone | 1-(4',6'-Difluoro-1',3',5'-triazin-2'-yl-amino)-8-naphthol-3,6-disulfonic acid | 1-Naphthylamine-3,8-disulfonic acid | red |
| 39 | 2-Methoxy-aniline-5-β-sulfatoethylsulfone | 1-(4',6'-Difluoro-1',3',5'-triazin-2'-yl-amino)-8-naphthol-3,6-disulfonic acid | Ammonia | bluish-tinged red |
| 40 | 2-Methoxy-aniline-5-β-sulfatoethylsulfone | 1-(4',6'-Difluoro-1',3',5'-triazin-2'-yl-amino)-8-naphthol-3,6-disulfonic acid | Aniline-3-sulfonic acid | bluish-tinged red |
| 41 | 4-Methoxy-aniline-3-β-vinylsulfone | 1-(4',6'-Difluoro-1',3',5'-triazin-2'-yl-amino)-8-naphthol-3,6-disulfonic acid | Aniline-4-sulfonic acid | bluish-tinged red |
| 42 | 2,5-Dimethyl-aniline-4-β-sulfatoethylsulfone | 1-(4',6'-Difluoro-1',3',5'-triazin-2'-yl-amino)-8-naphthol-3,6-disulfonic acid | Aniline-3-sulfonic acid | red |

-continued

| Example | Diazo component | Coupling component | Amine H-Y | Color shade |
|---|---|---|---|---|
| 43 | 2,5-Dimethoxy-aniline-4-β-thiosulfatoethyl-sulfone | 1-(4',6'-Difluoro-1',3',5'-triazin-2'-yl-amino)-8-naphthol-3,6-disulfonic acid | Aniline-3-sulfonic acid | bluish-tinged red |
| 44 | 4-β-Sulfatoethylsulfonyl-aniline-2-sulfonic acid | 1-(4',6'-Difluoro-1',3',5'-triazin-2'-yl-amino)-8-naphthol-3,6-disulfonic acid | Aniline-3-sulfonic acid | bluish-tinged red |
| 45 | 8-β-Sulfatoethylsulfonyl-2-naphthylamine-6-sulfonic acid | 1-(4',6'-Difluoro-1',3',5'-triazin-2'-yl-amino)-8-naphthol-3,6-disulfonic acid | Ammonia | bluish-tinged red |
| 46 | 6-β-Sulfatoethylsulfonyl-2-naphthylamine-1-sulfonic acid | 1-(4',6'-Difluoro-1',3',5'-triazin-2'-yl-amino)-8-naphthol-3,6-disulfonic acid | Aniline-3-sulfonic acid | bluish-tinged red |
| 47 | Aniline-4-β-Sulfatoethylsulfone | 1-(4',6'-Difluoro-1',3',5'-triazin-2'-ylamino)-8-naphthol-4,6-disulfonic acid | Ammonia | red |
| 48 | Aniline-4-β-Sulfatoethylsulfonyl-sulfone | 1-(4',6'-Difluoro-1',3',5'-triazin-2'-ylamino)-8-naphthol-4,6-disulfonic acid | 2-Amino-ethanesulfonic acid | red |
| 49 | Aniline-4-β-thiosulfato-ethylsulfone | 1-(4',6'-Difluoro-1',3',5'-triazin-2'-ylamino)-8-naphthol-4,6-disulfonic acid | Methylamine | red |
| 50 | Aniline-4-β-sulfatoethyl-sulfone | 1-(4',6'-Difluoro-1',3',5'-triazin-2'-ylamino)-8-naphthol-4,6-disulfonic acid | Benzylamine-4-sulfonic acid | red |
| 51 | 2-Methyl-aniline-5-β-sulfato-ethylsulfone | 1-(4',6'-Difluoro-1',3',5'-triazin-2'-ylamino)-8-naphthol-4,6-disulfonic acid | 2-Amino-succinic acid | red |
| 52 | 3-Sulfatoethylsulfonyl-aniline-6-carboxylic acid | 1-(4',6'-Difluoro-1',3',5'-triazin-2'-ylamino)-8-naphthol-4,6-disulfonic acid | Ammonia | red |
| 53 | 6-β-Sulfatoethylsulfonyl-2-napthylamine-1-sulfonic acid | 1-(4',6'-Difluoro-1',3',5'-triazin-2'-ylamino)-8-naphthol-4,6-disulfonic acid | Aniline-3-sulfonic acid | red |
| 54 | 4-Amino-benzanilide-3'-β-sulfatoethylsulfone | 1-(4',6'-Difluoro-1',3',5'-triazin-2'-ylamino)-8-naphthol-4,6-disulfonic acid | Aniline-3-sulfonic acid | red |
| 55 | 3-Amino-benzanilide-3'-β-sulfatoethylsulfone-6'-carboxylic acid | 1-(4',6'-Difluoro-1',3',5'-triazin-2'-ylamino)-8-naphthol-4,6-disulfonic acid | Aniline-3-sulfonic acid | red |
| 56 | Aniline-4-β-sulfatoethyl-sulfone | 2-(4',6'-Difluoro-1',3',5'-triazin-2'-ylamino)-5-naphthol-7-sulfonic acid | Aniline-3-sulfonic acid | orange |
| 57 | Aniline-4-β-sulfatoethyl-sulfone | 2-(4',6'-Difluoro-1',3',5'-triazin-2'-ylamino)-5-naphthol-7-sulfonic acid | 2-Amino-ethane-sulfonic acid | orange |
| 58 | 4-Methoxy-aniline-3-β-sulfatoethylsulfone | 2-(4',6'-Difluoro-1',3',5'-triazin-2'-ylamino)-5-naphthol-7-sulfonic acid | Aniline-4-sulfonic acid | scarlet |
| 59 | 2-Methoxy-aniline-5-β-sulfatoethylsulfone | 2-(4',6'-Difluoro-1',3',5'-triazin-2'-ylamino)-5-naphthol-7-sulfonic acid | Aniline-3-sulfonic acid | scarlet |
| 60 | 2,5-Dimethoxy-aniline-4-β-sulfatoethylsulfone | 2-(4',6'-Difluoro-1',3',5'-triazin-2'-ylamino)-5-naphthol-7-sulfonic acid | Aniline-3-sulfonic acid | scarlet |
| 61 | 2,5-Dimethoxy-aniline-4-β-thiousulfatoethylsulfone | 2-(4',6'-Difluorotriazin-2'-ylamino)-8-naphthol-6-sulfonic acid | Aniline-4-sulfonic acid | red |
| 62 | 4-Methoxy-aniline-2-sulfonic acid | 2-(N—Methyl-4',6'-difluoro-triazin-2'-ylamino)-5-naphthol-7-sulfonic acid | 2-Aminoethyl-1-(β-sulfatoethyl-sulfone) | scarlet |
| 63 | 2-Methoxy-aniline-4-sulfonic acid | 2-(N—Methyl-4',6'-difluoro-triazin-2'-ylamino)-5-naphthol-7-sulfonic acid | 3-Aminopropyl-1-(β-chloro-ethyl-sulfone) | " |
| 64 | 4-Methoxy-aniline-3-β-sulfatoethylsulfone | 2-(N—Methyl-4',6'-difluoro-triazin-2'-ylamino)-5-naphthol-7-sulfonic acid | Aniline-3-sulfonic acid | " |

-continued

| Example | Diazo component | Coupling component | Amine H-Y | Color shade |
|---|---|---|---|---|
| 65 | 2-Methoxy-aniline-5-β-thiosulfatoethylsulfone | 2-(4',6'-Difluorotriazin-2'-ylamino)-5-naphthol-7-sulfonic acid | Ammonia | " |
| 66 | 6-β-Sulfatoethylsulfonyl-2-naphthylamine-1-sulfonic acid | 2-(4',6'-Difluorotriazin-2'-ylamino)-5-naphthol-7-sulfonic acid | Aniline-3-sulfonic acid | " |
| 67 | 4-β-Sulfatoethylsulfonyl-aniline | 1-[4'-(4'',6''-Difluoro-triazin-2''-ylamino)-2'-sulfophenyl]-3-carboxy-5-pyrazolone | Ammonia | yellow |
| 68 | 2,5-Dimethoxy-4-β-sulfato-ethylsulfonyl-aniline | 1-[4'-(4'',6''-Difluoro-triazin-2''-ylamino)-2'-sulfophenyl]-3-carboxy-5-pyrazolone | Aniline-3-sulfonic acid | golden yellow |
| 69 | 2,5-Dimethyl-4-amino-azo-benzene-4''-β-sulfatoethyl-sulfone | 1-[4'-(4'',6''-Difluoro-triazin-2''-ylamino)-2'-sulfophenyl]-3-carboxy-5-pyrazolone | Aniline-4-sulfonic acid | orange |
| 70a | 4'-β-Sulfatoethylsulfonyl-2,5-dimethyl-4-amino-azo-benzene-2'-sulfonic acid | 1-Naphthylamine-8-sulfonic acid | Aniline-3-sulfonic acid | orange |
| 70b | Aniline-4-β-sulfatoethyl-sulfone | 1-[Benzoyl-4'-(4'',6''-di-fluoro-1'',3'',5''-triazin-2''-yl)-amino]-8-naphthol-3,6-disulfonic acid | Aniline-3-sulfonic acid | red |
| 70c | 6-β-Sulfatoethylsulfonyl-2-naphthylamine-1-sulfonic acid | 1-[Benzoyl-4'-(4'',6''-di-fluoro-1'',3'',5''-triazin-2''-yl)-amino]-8-naphthol-3,6-disulfonic acid | Aniline-3-sulfonic acid | bluish-tinged red |
| 70d | Aniline-3-β-sulfatoethyl-sulfone | 2-(4',6'-Difluoro-1',3',5'-triazin-2'-yl-amino)-5-hydroxy-naphthalene-1,5-disulfonic acid | Aniline-3-sulfonic acid | orange |

EXAMPLE 71

Initially, the primary condensation product of aniline-3-sulfonic acid and cyanuric fluoride is prepared analogously to Example 4, and this is then subjected to a further condensation with an equimolar amount of 1,3-diamino-benzene-4-sulfonic acid. The diaminobenzene-sulfonic acid monoacylated in this way is then diazotized in the conventional manner and added to a neutral solution of 1-(4'-β-sulfatoethylsulfonyl)-phenyl-3-methyl-5-pyrazolone.

After coupling, the dye obtained is isolated; in the form of the acid, it has the following structure:

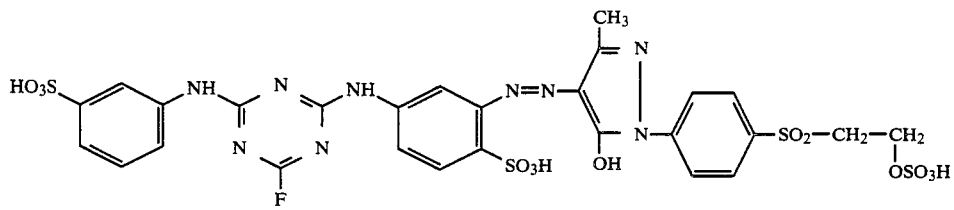

On dyeing and on printing, the dye gives a greenish-tinged yellow hue on cotton and on wool.

EXAMPLES 72 TO 81c

Following an analogous procedure as described in Examples 1 to 5 and 71, but using a diazo component and coupling component indicated in the Examples of the following Table, in a corresponding manner, valuable dyes according to the invention, which dye cotton in the indicated color shades with good fastness properties, are likewise obtained.

| Example | Diazo component | Coupling component | Color shade |
|---|---|---|---|
| 72 | 3-[4'-Fluoro-6-'-(3''-sulfophenyl-amino)-triazin-2'-ylamino]-aniline-6-sulfonic acid | 1-(4'-β-Sulfatoethyl-sulfonyl)-phenyl-3-carboxy-5-pyrazolone | yellow |
| 73 | 3-[4'-Fluoro-6'-(3''-sulfophenyl amino)-triazin-2'-ylamino]-aniline-6-sulfonic acid | 2-(N—Methyl-ethionyl-amino)-8-naphthol-6-sulfonic acid | scarlet |
| 74 | 3-[4'-Fluoro-6'-(3''-sulfophenyl amino)-triazin-2'-ylamino]-aniline-6-sulfonic acid | 2-(N—Methyl-ethionyl)-5-naphthol-7-sulfonic acid | orange |
| 75 | 2'-[4''-Fluoro-6''-(3'''-sulfo-phenylamino)-triazin-2''-yl-amino]-4'-amino-azobenzene-4,5'- | 1-(4'-β-Sulfatoethylsulfonyl)-phenyl-3-carboxy-5-pyrazolone | orange |

-continued

| Example | Diazo component | Coupling component | Color shade |
|---|---|---|---|
| | disulfonic acid | | |
| 76 | 4-[4'-Fluoro-6'-(3''-sulfophenyl-amino)-triazin-2'-yl-amino]-aniline-2,5-disulfonic acid | 1-(4'-β-Sulfatoethylsulfonyl)-phenyl-3-methyl-5-pyrazolone | yellow |
| 77 | 3-(4'-Fluoro-6'-β-sulfatoethyl-amino-triazin-2'-ylamino)-aniline-6-sulfonic acid | 1-Amino-2-(2'-sulfo-4'-β-sulfato-ethylsulfonyl-phenyl-azo)-8-naphthol-3,6-disulfonic acid (coupling in 7-position) | blue |
| 78 | 4-(4'Fluoro-6'-β-hydroxy-ethyl-amino-triazin-2'-yl-amino)-aniline-2,5-disulfonic acid | 1-Amino-2-(2'-sulfo-4'-β-sulfato-ethylsulfonyl-phenyl-azo)-8-naphthol-3,6-disulfonic acid (coupling in 7-position) | greenish-tinged blue |
| 79 | 4-(4'Fluoro-6'-β-hydroxy-ethyl-amino-triazin-2'-yl-amino)-aniline-2,5-disulfonic acid | 1-Amino-2-(2'-bromo-4'-β-sul-fatoethylsulfonyl-phenylazo)-8-naphthol-3,6-disulfonic acid (coupling in 7-position) | greenish-tinged blue |
| 80 | 4-(N—Methyl-ethionylamino)-aniline | 1-Amino-2-[2'-sulfo-5'-{4''-fluoro-6''-(3'''-sulfophenyl-amino)-triazin-2''-ylamino}-phenylazol]-8-naphthol-3,6-disulfonic acid | blue |
| 81a | 3-(4'-Fluoro-6'-β-sulfato-ethylamino-triazin-2'-yl-amino)-aniline-4,6-disulfonic acid | 1-Amino-2-[4'-(N—methyl-ethionylphenylamino)-phenylazo]-8-naphthol-3,6-disulfonic acid | blue |
| 81b | 4-[4'-Fluoro-6'-(3''-sulfo-phenylamino)-triazin-2'-yl-amino]-aniline-2,5-disulfonic acid | 1-(3'-β-Chloroethylsulfonyl)-benzoylamino-8-naphthol-3,6-disulfonic acid | red |
| 81c | 3-[4'-Fluoro-6'-(3''-sulfophenyl-amino)-triazin-2'-ylamino]-aniline-6-sulfonic acid | 1-Hydroxy-naphthalene-4-β-sulfatoethylsulfone | orange |

EXAMPLE 82

66 parts of 2-amino-4-β-sulfatoethylsulfonylphenol are introduced into 200 parts of ice water and 40 parts of concentrated hydrochloric acid are added. Diazotization is carried out with 40 parts by volume of 5N sodium nitrite solution. After a further stirring period of 1 hour at 0° to 5° C., a little amidosulfonic acid is added in order to destroy excess nitrous acid.

48 parts of 2-amino-5-naphthol-7-sulfonic acid are dissolved in 500 parts of water with the addition of sodium hydroxide solution and this solution is then combined with the diazonium salt solution. The mixture is stirred for 5 hours at room temperature and at a pH value of 6.5. The pH value is raised to 7.5 with sodium hydroxide solution, and the solution is clarified, using a little kieselguhr. 40 parts by volume of 5N sodiun nitrite solution are then added. With stirring, the mixture is allowed to run in the course of 1 hour onto 500 parts of ice to which 60 parts of concentrated hydrochloric acid were added. The mixture is stirred for a further 3 hours at 0° to 5° C. and a little amidosulfonic acid is then added.

This diazonium salt solution is then allowed to run into a solution which contains the secondary condensation product from equivalent amounts of 1-amino-8-naphthol-3,6-disulfonic acid, cyanuric fluoride and aniline-3-sulfonic acid and which was prepared as indicated in Example 1. The mixture is stirred further at pH 6.0 to 6.5, until the coupling reaction is complete. The mixture is then warmed to 45° C. and a solution of 50 parts of crystalline copper sulfate in 200 parts of water is added, and stirring is continued until the metallization is complete. Subsequently, the mixture is cooled to 15° C., 15 parts of oxalic acid are added and stirring is continued for 2 hours. The mixture is clarified by filtration, with the addition of kieselguhr. Finally, the dye solution is evaporated to dryness, after the addition of phosphate buffer. After grinding, an almost black dye powder is obtained which contains the sodium salt of the compound of the formula

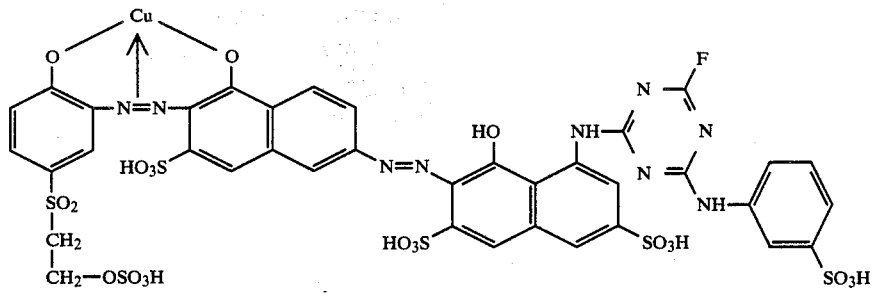

The dye is outstandingly suitable for dyeing cotton fibers, dyeings and prints of a black-blue hue being obtained, which have very good fastness to wet processing.

EXAMPLE 83

If, in place of 2-amino-5-naphthol-7-sulfonic acid as in Example 82, equal parts of 2-amino-8-naphthol-6-sulfonic acid are used, a dye is obtained analogously, which contains the compound of the formula ponents indicated in the Examples of the following Table are used and the azo compounds obtained are

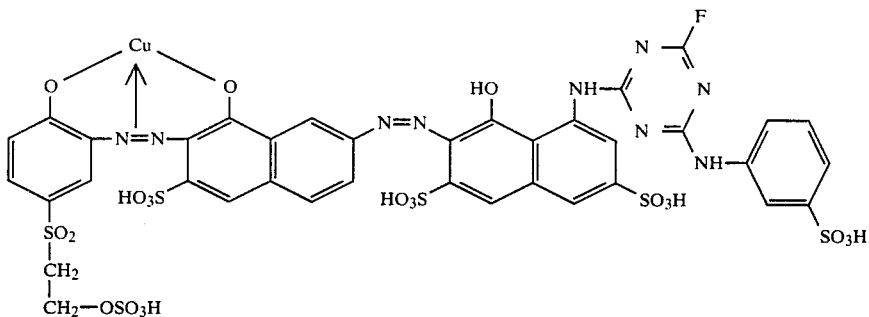

which dyes cotton in a fast dark blue.

EXAMPLES 84 TO 92o

If the procedure indicated in Example 82 or Example 83, or an analogous procedure familiar to an expert, is followed and the diazo components and coupling components are converted with a salt of the corresponding metal into the corresponding metal complex dyes, very valuable dyes according to the invention, having good fastness properties and giving the indicated color shades on cotton fibers, are likewise obtained.

| Example | Diazo component | Coupling component | Metal | Color shade |
|---|---|---|---|---|
| 84 | 5-β-Sulfatoethylsulfonyl-2-amino-phenol | 8-[4'-Fluoro-6'-(3"-sulfo-phenylamino)-triazin-2'-yl-amino]-1-naphthol-3,6-disulfonic acid | Cu | violet |
| 85 | 8-β-Sulfatoethylsulfonyl-6-sulfo-2-naphthylamine | 8-[4'-Fluoro-6'-(3"-sulfo-phenylamino)-triazin-2'-yl-amino]-1-naphthol-3,6-disulfonic acid | Cu (oxidative) | blue |
| 86 | 2,5-Dimethoxy-aniline-4-β-sulfatoethylsulfone | 8-[4'-Fluoro-6'-(3"-sulfo-phenylamino)-triazin-2'-yl-amino]-1-naphthol-3,6-disulfonic acid | Cu (with demethylation) | blue |
| 87 | 4-β-Sulfatoethylsulfonyl-2-amino-benzoic acid | 2-[4'-Fluoro-6'-(4'''-nitro-2'',2'''-disulfostilben-4''-ylamino)-triazin-2'-ylamino]-5-naphthol-7-sulfonic acid | Cr | brown |
| 88 | 5-β-Sulfatoethylsulfonyl-2-amino-phenol | 1-[4'-{4''-Fluoro-6''-(3'''-sulfophenyl-amino)-triazin-2''-ylamino}-2'-sulfophenyl]-3-carboxy-5-pyrazolone | Cu | brown |
| 89 | 4-β-Sulfatoethylsulfonyl-2-amino-phenol-6-sulfonic acid | 1-[3'-(4''-Fluoro-6''-amino-triazin-2''-ylamino)-6'-sulfophenyl]-3-carboxy-5-pyrazolone | Cu | yellow |
| 90 | 2-Amino-naphthol-4,8-disulfonic acid | 1-[4'-Fluoro-6'-(3'''-β-sulfatoethylsulfonyl-benz-anilide-3''-amino)-triazin-2'-ylamino]-8-naphthol-3,6-disulfonic acid | Cu | blue |
| 91 | 1-Amino-6-[4'-fluoro-6'-{2''-(4'''-β-sulfatoethyl-sulfonyl-phenyl)-ethyl-1''-amino}-triazin-2'-ylamino]-2-naphthol-4-sulfonic acid | 1-Amino-8-naphthol-2,4-disulfonic acid | Cu | blue |
| 92a | 2-Methoxy-5-methyl-4-(2',5'-disulfophenylazo)-aniline | 2-(N—Methyl-acetylamino)-5-naphthol-7-sulfonic acid, coppered with demethylation, saponified and condensed with 2,4-difluoro-6-[2'-(4''-β-sulfatoethylsulfophenyl)-ethyl-1'-amino]-triazine | Cu | blue |
| 92b | 4-β-Sulfatoethylsulfonyl-2-amino-phenol | 2-[4'-Fluoro-6'-(3"-sulfo-phenyl-amino)-triazin-2'-ylamino]-5-naphthol-7-sulfonic acid | Cu | ruby |
| 92c | 4-β-Sulfatoethylsulfonyl-2-amino-phenol-6-sulfonic acid | 2-[4'-Fluoro-6'-(3"-sulfo-phenyl-amino)-triazin-2'-ylamino]-5-naphthol-7-sulfonic acid | Cu | ruby |
| 92d | 4-β-Sulfatoethylsulfonyl-2-aminophenol | 3-[4'-Fluoro-6'-(3"-sulfo-phenylamino)-triazin-2'- | Cu | ruby |

| Example | Diazo component | Coupling component | Metal | Color shade |
|---|---|---|---|---|
| | | ylamino]-5-naphthol-1,7-disulfonic acid | | |
| 92e | 4-β-Sulfatoethylsulfonyl-2-amino-phenol-6-sulfonic acid | 1-[4'-Fluoro-6'-(3"-sulfophenylamino)-triazin-2'-ylamino]-8-naphthol-3,6-disulfonic acid | Cu | violet |
| 92f | 5-β-Sulfatoethylsulfonyl-2-amino-phenol | 1-[4'-Fluoro-6'-(3"-sulfophenylamino)-triazin-2'-ylamino]-8-naphthol-3,6-disulfonic acid | Cu | violet |
| 92g | 5-β-Sulfatoethylsulfonyl-2-amino-phenol | 1-[4'-Fluoro-6'-(3"-sulfophenylamino)-triazin-2'-ylamino]-8-naphthol-3,6-disulfonic acid | Cr | reddish-tinged blue |
| 92h | 5-β-Sulfatoethylsulfonyl-2-amino-phenol | 1-[4'-Fluoro-6'-(3"-sulfophenylamino)-triazin-2'-ylamino]-8-naphthol-3,6-disulfonic acid | Co | bluish-tinged violet |
| 92i | 4-β-Sulfatoethylsulfonyl-2-amino-phenol-6-sulfonic acid | 1-[4'-Fluoro-6'-(3"-sulfophenylamino)-triazin-2'-ylamino]-8-naphthol-3,6-disulfonic acid | Cr | reddish-tinged blue |
| 92j | 3-[4'-Fluoro-6'-(3"-sulfophenyl-amino)-triazin-2'-ylamino]-aniline-6-sulfonic acid | 1,2',3-Trihydroxy-3'-sulfo-azobenzene-5-β-sulfatoethylsulfone | Cu | yellowish-tinged brown |
| 92k | 2-Naphthylamine-6-β-sulfatoethylsulfone | 1-[4'-Fluoro-6'-(3"-sulfophenylamino)-triazin-2'-ylamino]-8-naphthol-4,6-disulfonic acid | Cu | reddish-tinged blue |
| 92l | 8-β-Sulfatoethylsulfonyl-2-naphthylamine-6-sulfonic acid | 3-[4'-Fluoro-6'-(3"-sulfophenylamino)-triazin-2'-ylamino]-2-naphthol-5,7-disulfonic acid | Cu (oxidative) | blue |
| 92m | 4-(2'-Sulfo-4'-β-sulfatoethylsulfonyl-phenylazo)-1-naphthylamine-6-sulfonic acid | 2-[4'-Fluoro-6'-(3"-sulfophenylamino-triazin-2'-ylamino]-5-naphthol-7-sulfonic acid | Cu (oxidative) | reddish-tinged blue |
| 92n | 4-Amino-3-hydroxy-6-methyl-2'-sulfo-4'-β-sulfatoethylsulfonyl-azobenzene | 2-[4'-Fluoro-6'-(3"-sulfophenylamino-triazin-2'-ylamino]-5-naphthol-7-sulfonic acid | Cu (oxidative) | reddish-tinged blue |
| 92o | 4-β-Sulfatoethylsulfonyl-1-naphthylamine | 2-[4'-Fluoro-6'-(3"-sulfophenylamino)-triazin-2'-ylamino]-5-naphthol-4,8-disulfonic acid | Cu (oxidative) | reddish-tinged blue |

EXAMPLE 93

61 parts of the aminophenyl-naphthotriazole of the formula

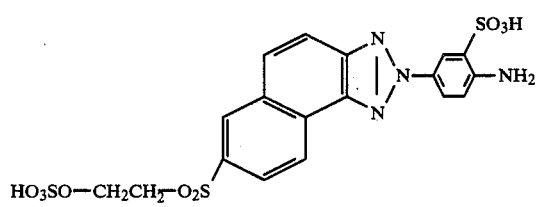

are dissolved in 700 parts of water at pH 7 to 7.5. 20 parts by volume of 5N sodium nitrite solution are then added. With good stirring, the solution is allowed to run in the course of 20 minutes into a mixture of 30 parts by volume of concentrated hydrochloric acid and 200 parts of crushed ice. After a further stirring period of 1 hour, excess nitrous acid is destroyed with a little amidosulfonic acid. An aqueous, neutral solution of 0.1 mole of 1-{4'-[4"-fluoro-6"-(2'",5'"-disulfophenyl-amino)-s-triazin-2"-ylamino]-2'-sulfo-phenyl}-3-carboxy-5-pyrazolone in 400 parts by volume of water is then added. For coupling, the pH value is maintained at 5.0 to 5.5, by sprinkling in sodium bicarbonate. Stirring is continued for 1 further hour at 20° C. and pH 6.5, and the dye of the formula

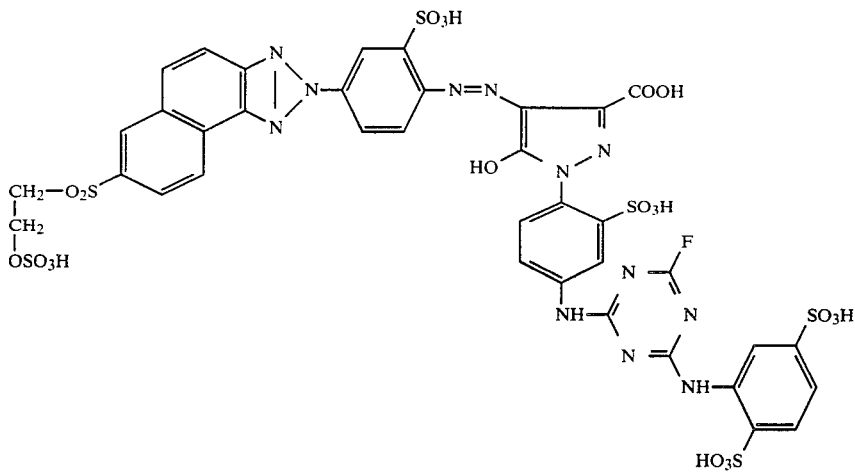

is then salted out as the sodium salt. After isolation, washing, drying and grinding, a dye powder is obtained which dyes cotton in fast yellow shades.

EXAMPLES 94a TO 96c

Following a procedure analogous to that indicated in Example 93, but correspondingly starting from the diazo components, coupling components and triazine compounds as acylating agents, as indicated in the examples in the following tables, valuable dyes according to the invention, which dye cotton in the indicated color shades with good fastness, are likewise obtained.

| Example | Diazo component | Coupling component | Acylating agent | Color shade |
|---|---|---|---|---|
| 94a | 8-β-Sulfatoethylsulfonyl-2-naphthylamine-6-sulfonic acid | 1,3-Diamino-benzene-6-sulfonic acid | 4,6-Difluoro-2-(3'-sulfophenyl-amino)-triazine | reddish-tinged yellow |
| 94b | 8-β-Sulfatoethylsulfonyl-2-naphthylamine-6-sulfonic acid | 3-Amino-phenylurea | 4,6-Difluoro-2-(3'-sulfophenyl-amino)-triazine | yellow |
| 94c | 8-β-Sulfatoethylsulfonyl-2-naphthylamine-6-sulfonic acid | 1-Amino-naphthalene-6-sulfonic acid | 4,6-Difluoro-2-(3'-sulfophenyl-amino)-triazine | reddish-tinged yellow |
| 94d | Aniline-2,5-disulfonic acid | 1-Naphthylamine-6-β-hydroxyethylsulfone | 4,6-Difluoro-2-(3'-sulfophenyl-amino)-triazine | yellow |
| 94e | 2-Naphthylamine-4,6,8-trisulfonic acid | 1-Naphthylamine-6-β-hydroxyethylsulfone | 4,6-Difluoro-2-(3'-sulfophenyl-amino)-triazine | reddish-tinged yellow |
| 95a | 1-Amino-4-(2',5'-disulfophenylazo)-naphthalene-6-β-sulfatoethylsulfone | 1-Aminonaphthalene-8-sulfonic acid | 4,6-Difluoro-2-(3'-sulfophenyl-amino)-triazine | reddish-tinged brown |
| 95b | 1-Amino-4-(2',5',7'-trisulfo-1'-naphthylazo)-naphthalene-6-β-sulfatoethylsulfone | 1-Aminonaphthalene-8-sulfonic acid | 4,6-Difluoro-2-(3'-sulfophenyl-amino)-triazine | violet-tinged brown |
| 96a | 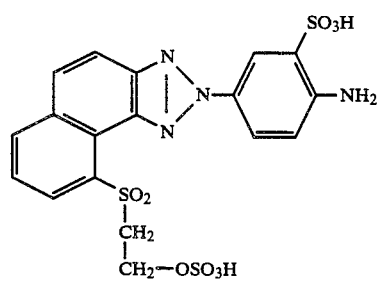 | 3-Methylaniline | 4,6-Difluoro-2-(2',5'-disulfophenylamino)-triazine | yellow |

| Example | Diazo component | Coupling component | Acylating agent | Color shade |
|---|---|---|---|---|
| 96b | ![structure] | 4-Amino-acetoacetyl-anilide-3-sulfonic acid | 4,6-Difluoro-2-(3'-sulfophenyl-amino)-triazine | yellow |
| 96c | ![structure] | 1-(β-Aminoethyl)-2-hydroxy-4-methyl-5-cyano-6-pyridone | 4,6-Difluoro-2-(2',5'-disulfophenylamino)-triazine | yellow |

EXAMPLE 97

52 parts of the amino-naphthotriazole of the formula

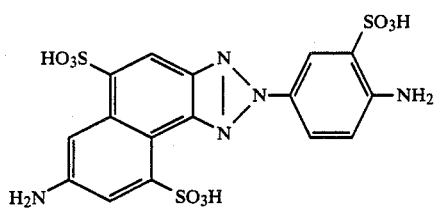

are dissolved in 600 parts of water at pH 6, and the primary condensation product is added which was prepared by reacting 19 parts of aniline-3-sulfonic acid and 14 parts of cyanuric fluoride in water at 0° C. and at pH 5.5 to 6.0. Stirring is continued for 1 further hour at a pH value of 5.5 to 6.0 and at 15° to 20° C., until the pH value no longer changes. The pH value is then adjusted to 7 to 7.3 with sodium carbonate, and 20 parts by volume of 5N sodium nitrite solution are added. The mixture is then allowed to run, with stirring, into 30 parts by volume of concentrated aqueous hydrochloric acid to which 400 parts of crushed ice are added in portions so that the temperature always remains below 5° C. Stirring is continued for a further 15 minutes, and excess nitrous acid is then destroyed with a little amidosulfonic acid, and this is followed immediately by the addition of a solution which was obtained by dissolving 36.2 parts of 1-(4'-β-sulfatoethylsulfonyl)-3-methyl-5-pyrazolone and 16 parts of sodium bicarbonate in 200 parts by volume of water. Stirring is continued for a further 30 minutes at room temperature, the pH value being maintained at 5.5 to 6.0.

8 parts of disodium phosphate are then added. The dye of the formula

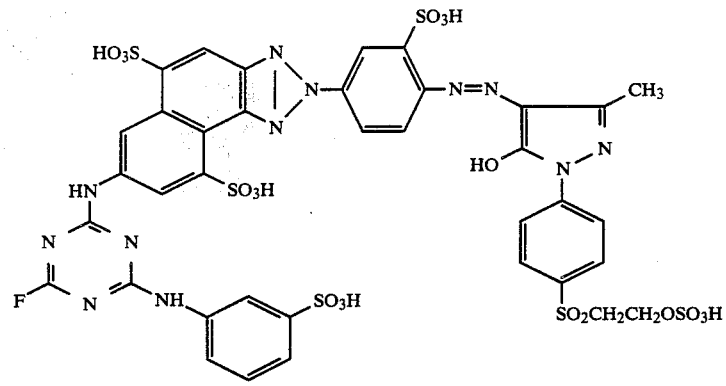

is isolated by salting out and filtration, and is dried and ground. It dyes cotton in fast yellow shades.

EXAMPLES 98 TO 100

Proceeding in an analogous manner, as described, for example, in the preceding Examples 93 and 97, and starting from the corresponding diazo components, coupling components and acylating agents (triazine derivatives or cyanuric fluoride and the amine H-Y), valuable dyes according to the invention, which dye cotton in the color shades indicated below, are likewise obtained.

| Example | | Color shade |
|---|---|---|
| 98 | (structure) | yellow |
| 99 | (structure) | yellow |
| 100 | (structure) | yellow |

EXAMPLE 101

52 parts of the dye 1-amino-4-(3'-amino-4'-β-hydroxyethylsulfonyl-phenylamino)-anthraquinone-2-sulfonic acid (prepared by a condensation reaction of 1,3-diaminobenzene-4-β-hydroxyethylsulfone and 1-amino-4-bromo-anthraquinone-2-sulfonic acid) are introduced, with stirring, as a dry, ground material into 200 parts of sulfuric acid monohydrate. Stirring is continued overnight at room temperature, and the solution is then poured with stirring onto a mixture of 500 parts of ice and 150 parts of potassium chloride.

The precipitated dye is then filtered off with suction, washed with saturated sodium chloride solution and dissolved in 300 parts of water under neutral conditions, with the addition of sodium bicarbonate. This dye solution is added to the solution of the primary condensation product, prepared according to Example 1, of 0.1 mole each of cyanuric fluoride and aniline-3-sulfonic acid. The mixture is stirred for 5 hours at 15° to 20° C., the pH value being maintained at 6 by the addition of sodium bicarbonate powder. Stirring is then continued for a further 2 hours at 30° to 40° C. The dye is salted out with sodium chloride, isolated on a suction filter and dried at 50° to 60° C., with the addition of 5 parts of phosphate buffer. Using the reactive dye obtained, of the formula

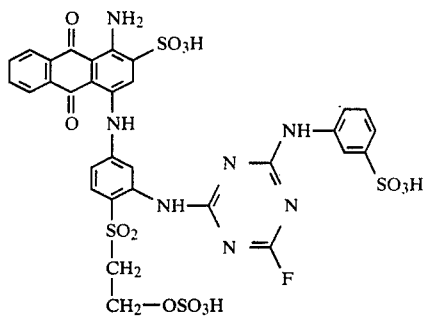

dyeings and prints of a clear blue shade with very good fastness to wet processing are obtained on wool and cotton.

EXAMPLE 102

54 parts of the dye 1-amino-4-(2'-methyl-5'-amino-4'-β-hydroxyethylsulfonyl-phenylamino)-anthraquinone-2-sulfonic acid (prepared by a condensation reaction of 1-amino-4-bromo-anthraquinone-2-sulfonic acid and 2,4-diaminotoluene-5-β-hydroxyethylsulfone) are reacted analogously to Example 101. This gives the dye of the formula (shown in the form of the acid)

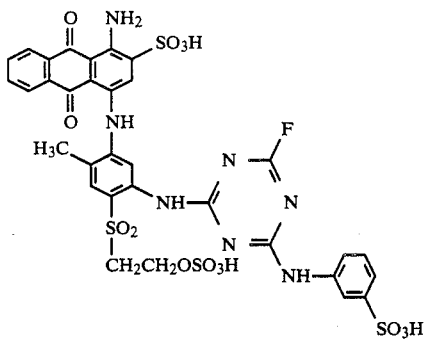

which dyes wool and cotton in a fast, clear blue.

EXAMPLE 103

127 parts of the dye (3-amino-4-sulfophenylaminosulfonyl)-(3-β-sulfatoethylsulfonyl-phenylaminosulfonyl)-copper-phthalocyanine-disulfonic acid (prepared by the mixed condensation reaction of copper-phthalocyanine-(3)-tetrasulfochloride with 1,3-diaminobenzene-4-sulfonic acid and 3-β-sulfatoethylsulfonyl-aniline in an aqueous solution in the presence of pyridine at pH 6 to 7.5) are dissolved in water under neutral conditions, with the addition of sodium bicarbonate.

To this dye solution is added the solution which was prepared as follows: 18 parts of aniline-2-sulfonic acid are dissolved in water under neutral conditions, with the addition of sodium bicarbonate. The mixture is cooled to 0° C. and 14 parts of cyanuric fluoride are added dropwise, the pH value being maintained at pH 6 to 6.5 by sprinkling in sodium bicarbonate.

When the condensation is completed, the dye solution is added. Stirring is continued for a further 3 hours at 20° to 25° C., the pH value being maintained at pH 6 to 6.5 by means of sodium bicarbonate.

The dye is salted out with sodium chloride, filtered off and dried. It contains the sodium salt of the compound of the formula

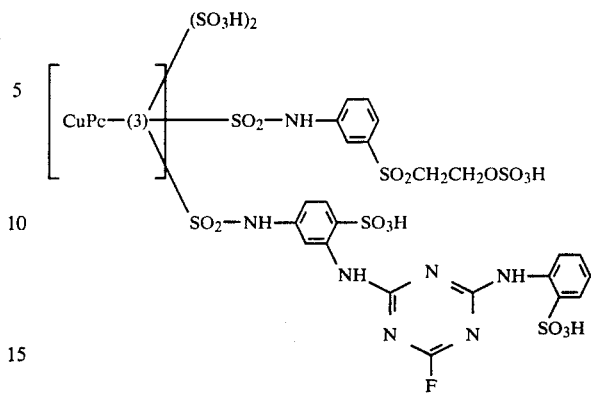

and it dyes cellulose fiber materials in a turquoise-blue shade.

EXAMPLE 104

136 parts of the dye (3-amino-4-β-sulfatoethylsulfonyl-phenylamino-sulfonyl)-copper-phthalocyaninetrisulfonic acid are dissolved under neutral conditions. The solution is cooled to 0° C. With stirring, 11 parts by volume of cyanuric fluoride are then added in the course of 15 minutes, and the mixture is stirred for a further ½ hour. During this, the pH value is maintained at 5.5 to 6.0 by the addition of sodium bicarbonate. Subsequently, a solution is added which was obtained by dissolving 8 parts of aminoacetic acid in 80 parts of water with the addition of 6 parts of sodium carbonate. Stirring is continued for a further 2 hours at a temperature of 20° to 25° C. and at a pH value of 6.5 to 7.2. With the addition of phosphate buffer, the dye solution is evaporated to dryness in a vacuum drying oven at 60° C.

The dye contains the sodium salt of the compound of the formula

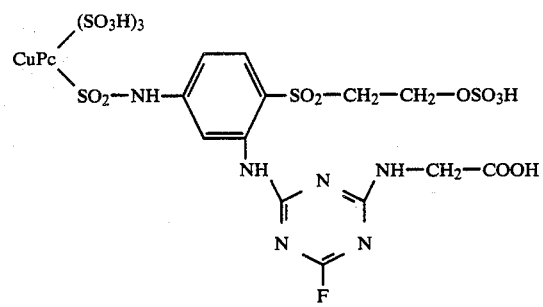

and it dyes cotton in fast, turquoise-blue color shades.

The compound used as the starting material is prepared as follows: copper-phthalocyanine-trisulfochloride-monosulfonic acid is subjected in aqueous solution at pH 67 to a condensation reaction with 1,3-diaminobenzene-4-β-hydroxyethylsulfone. The condensation product is separated out by the addition of sulfuric acid, isolated and dried. After grinding, the substance is esterified by conventional methods in sulfuric acid (monohydrate). With stirring, the mixture is then poured onto ice, and the precipitated compound is isolated on a suction filter and dissolved in water under neutral conditions, with the addition of sodium bicarbonate.

EXAMPLES 105a TO 105i

The examples in the following tables describe further phthalocyanine compounds according to the invention, which are characterized by their reaction components. They can be prepared in the manner according to the invention, as described in the preceding descriptive part, for example analogously to the process variants described in the preceding Examples 103 and 104, from the phthalocyanine components, known per se and indicated by their formulae in the examples in the tables, by means of the acylating agent indicated; acylation with the acylating agent takes place on the primary amine group which is provided with an * in the formulae of the phthalocyanine component. These phthalocyanine compounds according to the invention likewise possess very good fiber-reactive dye properties and give, in particular on cellulose fiber materials, strong and deep dyeings and prints of the color shades indicated for the particular example in the tables, in accordance with the application methods and fixing methods customary in industry. The phthalocyanine compounds according to the invention, indicated in these examples in the tables by their components, are written in the form of the free acid; preferably, they are present in the form of their alkali metal salts, in particular sodium salts.

| Example | Phthalocyanine component | Acylating agent | Color shade |
|---|---|---|---|
| 105a | [CuPc(3)] — (SO$_3$H)$_2$ / —SO$_2$—NH—CH$_2$—CH$_2$—NH$_2$* / —SO$_2$—NH—C$_6$H$_4$—SO$_2$—CH$_2$—CH$_2$—OSO$_3$H | 4,6-Difluoro-2-(3'-sulfophenylamino)-triazine | turquoise-blue |
| 105b | [CuPc(3)] — (SO$_3$H)$_2$ / —SO$_2$—NH—C$_6$H$_4$—NH$_2$* / —SO$_2$—NH—C$_6$H$_4$—SO$_2$—CH$_2$—CH$_2$—OSO$_3$H | 4,6-Difluoro-2-(3'-sulfophenylamino)-triazine | turquoise-blue |
| 105c | [CuPc(3)] — SO$_3$H / —SO$_2$—NH$_2$ / —SO$_2$—NH—CH$_2$—CH$_2$—NH$_2$* / —SO$_2$—NH—C$_6$H$_4$—SO$_2$—CH$_2$—CH$_2$—OSO$_3$H | 4,6-Difluoro-2-(3'-sulfophenylamino)-triazine | turquoise-blue |
| 105d | [CuPc(3)] — (SO$_3$H)$_2$ / —SO$_2$—NH—C$_6$H$_3$(NH$_2$*)(SO$_3$H) / —SO$_2$—NH—C$_6$H$_3$(OCH$_3$)—SO$_2$—CH$_2$—CH$_2$—OSO$_3$H | 4,6-Difluoro-2-(3'-sulfophenylamino)-triazine | turquoise-blue |

-continued

| Example | Phthalocyanine component | Acylating agent | Color shade |
|---|---|---|---|
| 105e | [NiPc(3)]—(SO$_3$H)$_2$, —SO$_2$—NH—C$_6$H$_3$(NH$_2$*)(SO$_3$H), —SO$_2$—NH—C$_6$H$_4$—SO$_2$—CH$_2$—CH$_2$—OSO$_3$H | 4,6-Difluoro-2-(4'-carboxyphenylamino)-triazine | bluish-tinged green |
| 105f | [NiPc(3)]—(SO$_3$H)$_2$, —SO$_2$—NH—C$_6$H$_4$—NH$_2$*, —SO$_2$—NH—C$_6$H$_4$—SO$_2$—CH$_2$—CH$_2$—OSO$_3$H | 4,6-Difluoro-2-(4'carboxyphenylamino)-triazine | bluish-tinged green |
| 105g | [CuPc(4)]—(SO$_3$H)$_2$, —SO$_2$—NH—C$_6$H$_3$(NH$_2$*)(SO$_3$H), —SO$_2$—NH—C$_6$H$_4$—SO$_2$—CH$_2$—CH$_2$—OSO$_3$H | 4,6-Difluoro-2-(4'-sulfophenylamino)-triazine | turquoise-blue |
| 105h | [CuPc(3)]—(SO$_3$H)$_2$, —SO$_2$—NH$_2$, —SO$_2$—NH—C$_6$H$_3$(NH$_2$*)—SO$_2$—CH$_2$—CH$_2$—OSO$_3$H | 4,6-Difluoro-2-(4'sulfophenylamino)-triazine | turquoise-blue |
| 105i | [NiPc(3)]—(SO$_3$H)$_{2,7}$, {—SO$_2$—NH—C$_6$H$_3$(NH$_2$*)—SO$_2$—CH$_2$—CH$_2$—OSO$_3$H}$_{1,3}$ | 4,6-Difluoro-2-(4'-sulfophenylamino)-triazine | bluish-tinged green |

EXAMPLE 106

23.3 parts of 2-carboxy-phenylhydrazine-4-sulfonic acid and 21.3 parts of 4-acetamino-benzaldehyde-2-sulfonic acid are subjected to a condensation reaction in aqueous solution, and the hydrazone obtained is coupled, in the presence of sodium carbonate, with the diazonium compound of 22.7 parts of 2-amino-phenol-4-(β-hydroxyethylsulfonate). Subsequently, an aqueous solution containing 25 parts of crystalline copper sulfate is added to the formazan produced. Stirring is continued for a further 2 hours at 25° to 30° C. and, after the addition of 15 parts of sodium carbonate, the copper complex formed is heated for 4 hours at the reflux temperature, in order completely to saponify the acetylamino group. The dye is then precipitated by the addition of sodium chloride, isolated and dried. After grinding, the dye powder is introduced into pyridine, with stirring.

The mixture is heated to 80° C. and a quantity of amidosulfonic acid equal to that of dye powder is added. The temperature thus rises up to 105° C. Stirring is continued for a further ½ hour at 100° to 105° C. Pyridine is then removed by distilling it off and drying the residue in vacuo, and the residue is dissolved in water and reacted with the primary condensation product prepared from cyanuric fluoride and aniline-3-sulfonic acid (according to Example 1). The mixture is stirred for 4 hours at 15° to 20° C. at a pH value of 6 to 6.5. The solution is then evaporated to dryness at 60° C. in vacuo. After grinding, a dye powder is obtained which contains the sodium salt of the compound of the formula

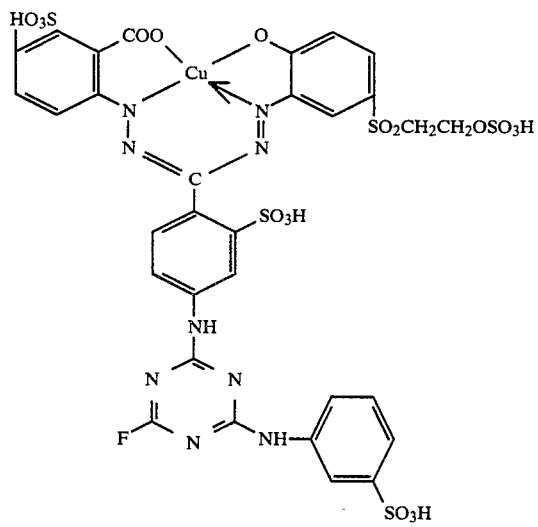

and dyes cotton in a blue shade.

EXAMPLE 106a

Further blue dyes according to the invention are obtained when, in place of aniline-3-sulfonic acid, equivalent quantities of the following amines are used in Example 106 for the preparation of the primary triazine condensation product:

aniline-4-sulfonic acid
aniline-2-sulfonic acid
aniline-2,5-disulfonic acid
1-naphthylamine-4-sulfonic acid
2-naphthylamine-4,6,8-trisulfonic acid
2-naphthylamine-3,6,8-trisulfonic acid
2-naphthylamine-6,8-disulfonic acid
2-naphthylamine-4,8-disulfonic acid.

EXAMPLE 107

The procedure of Example 106 is followed but, in place of the primary triazine condensation product, 11 parts by volume of cyanuric fluoride are added dropwise to the dye solution cooled to 0° C. During this, care is taken, by sprinkling in sodium bicarbonate, that the pH value does not fall below 6.0. Stirring is continued for ½ hour and 7 parts of ammonium chloride, dissolved in water, are then added. The mixture is stirred for a further 2 hours at room temperature and at a pH value of 6.8 to 7.3. The dye of the formula

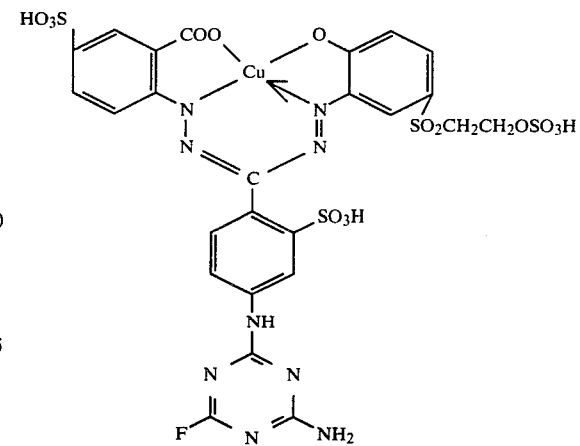

is separated out with sodium chloride. On cotton, this dye gives dyeings and prints of a reddish-tinged blue shade.

EXAMPLE 108

Further blue dyes according to the invention are obtained when, in place of ammonium chloride, equimolar quantities of the following amines or their salts are used in Example 107:

aminoacetic acid
taurine
methyltaurine
aminoethanol
diethanolamine
cyclohexylamine
aniline

EXAMPLES 109 to 117

Further blue reactive dyes according to the invention are obtained when, analogously to Example 106 and 107, the copper complexes of the following aminoformazan-β-hydroxyethylsulfones are used for esterification and the products are then reacted in the subsequent condensation reaction to give the fluorotriazinyl dye, equimolar amounts of amino dye, cyanuric fluoride and amine being employed:

| Example | |
|---|---|
| 109 | N—(2-Hydroxy-5-sulfo-3-amino-phenyl)-N'—(2'-carboxy-5'-β-hydroxyethylsulfonyl-phenyl)-ms-phenyl-formazan |
| 110 | N—(2-Hydroxy-5-sulfo-3-amino-phenyl)-N'—(2'-carboxy-5'-β-hydroxyethylsulfonyl-phenyl)-ms-(3''-sulfophenyl)-formazan |
| 111 | N—(2-Hydroxy-3-sulfo-phenyl-5-β-hydroxyethylsulfone)-N'—(2'-carboxy-4'-amino-phenyl)-ms-(phenyl)-formazan |
| 112 | N—(2-Hydroxy-phenyl-4-β-hydroxy ethylsulfone)-N'—(2'-carboxy-4'-aminophenyl)-ms-(3''-sulfophenyl)-formazan |
| 113 | N—(2-Hydroxy-phenyl-4-β-hydroxyethylsulfone)-N'—(2'-carboxy-5'-sulfophenyl)-ms-(3''-amino-phenyl)-formazan |
| 114 | N—(2-Carboxy-5'-β-hydroxy ethylsulfonyl-phenyl)-N'—(2'-hydroxy-3',5'-disulfophenyl-ms-(3''-amino-phenyl)-formazan |
| 115 | N—(2-Hydroxy-phenyl-5-β-hydroxyethylsulfone)-N'—(2'-carboxy-4'-amino-phenyl)-ms-(2'',4''-disulfo-phenyl)-formazan |
| 116 | N—(2-Hydroxy-phenyl-5-β-hydroxyethylsulfone)-N'—(2'-hydroxy-5'-sulfophenyl)-ms-(4''-amino-phenyl)-formazan |
| 117 | N—(2-Hydroxy-3-sulfophenyl-5-β-hydroxyethylsulfone)-N'—(2'-carboxy-4'-aminophenyl)-ms-(2''-chloro-5''-sulfo- |

| | -continued |
|---|---|
| Example | phenyl)-formazan |
| 5 | |

EXAMPLES 118 to 123

The procedure followed is analogous, for example, to that indicated in Example 106, but the starting compound used is here an aminoformazan which can be acylated and which corresponds to the general formula (2); when this is reacted with a difluorotriazine compound corresponding to the general formula (4), which was obtained from cyanuric fluoride and the amine of the formula (5), valuable dyes according to the invention, which dye cotton in the indicated color shades with good fastness properties, are likewise obtained.

fonic acid in 100 parts of water at 0° C. while keeping the pH in that condensation reaction at 6.5 which is maintained by means of sodium bicarbonate. After about 30 minutes, a neutral solution of 18.8 parts of 1,4-diaminobenzene-2-sulfonic acid in 200 parts of water is added, and the second condensation reaction is allowed to proceed at a pH of 5.5 to 6.5 and a temperature of 15°-20° C. with agitation for several hours. The condensation being complete, the solution is clarified, acidified with 35 parts by volume of a 31% aqueous hydrochloric acid, 500 parts of ice are added, and the batch is diazotized by slowly adding 20 parts by volume of an aqueous 5N sodium nitrite solution. As usual, excess nitrous acid is subsequently destroyed with some amidosulfonic acid. The diazonium salt suspension is then adjusted to pH 5.5 to 6.5 by adding 17.8 parts of sodium bicarbonate, and, as mentioned above, coupled at pH 5.5 to 6.5 with the solution of the monoazo com-

| | Amino compound (2) | Amine (5) | Color shade |
|---|---|---|---|
| 118 | N—(2-Hydroxy-5-sulfo-3-aminophenyl)-N'—(2'-carboxy-5'-β-sulfatoethylsulfonyl-phenyl)-ms-phenyl-formazan | Aniline-3-sulfonic acid | blue |
| 119 | N—(2-Hydroxy-5-sulfo-3-amino-phenyl)-N'—(2'-carboxy-5'-β-sulfatoethylsulfonyl-phenyl)-ms-phenyl-formazan | β-Amino-ethane-sulfonic acid | blue |
| 120 | N—(2-Hydroxy-phenyl-5-β-sulfatoethyl-sulfone)-N'—(2'-carboxy-4'-amino-phenyl)-ms-(2'',4''-disulfo-phenyl)-formazan | Aniline-2,5-disulfonic acid | blue |
| 121 | N—(2-Hydroxy-5-β-sulfatoethyl-sulfonyl-phenyl)-N'—(2'-carboxy-4'-sulfophenyl)-ms-(4''-amino-phenyl)-formazan | Aniline-4-sulfonic acid | greenish-tinged blue |
| 122 | N—(2-Hydroxy-phenyl-4-β-sulfatoethyl-sulfone)-N—(2'-hydroxy-5'-sulfophenyl)-ms-(4''-amino-phenyl)-formazan | 2-Naphthylamine-4,8-disulfonic acid | greenish-tinged blue |
| 123 | N—(2-Hydroxy-3-amino-5-sulfo-phenyl)-N—(2'-carboxy-5'-β-sulfatoethyl sulfonyl-phenyl)-ms-(2''-chloro-5''-sulfophenyl)-formazan | Aniline-3-sulfonic acid | blue |

EXAMPLE 124

A mixture of a neutral solution of 28.1 parts of aniline-4-β-sulfatoethylsulfone in 150 parts of water and of 20.3 parts by volume of an aqueous 5N sodium nitrite solution is poured at 0° to 5° C. with agitation into a mixture of 26 parts by volume of an 31% aqueous hydrochloric acid and 150 parts of ice. The suspension formed is stirred for a further hour, and excess nitrous acid is destroyed with amidosulfonic acid. For the coupling reaction, a solution of 31.9 parts of 1-amino-8-naphthol-3,6-disulfonic acid in 500 parts of water adjusted to pH 4 by means of hydrochloric acid is added. The pH of the coupling reaction is maintained at 3 to 3.5 by means of sodium acetate. This first coupling reaction being complete, the monoazo compound formed is reacted in the second coupling reaction with a diazonium salt solution. This diazonium salt solution is prepared as follows: 17.3 parts of cyanuric fluoride are slowly added to a neutral solution of 17.3 parts of aniline-3-sulfonic acid in 100 parts of water at 0° C. while keeping pound. The disazo compound formed is salted out with sodium chloride, suction-filtered and dried. After usual isolation of the dyestuff, the alkali metal salt of the compound of the formula

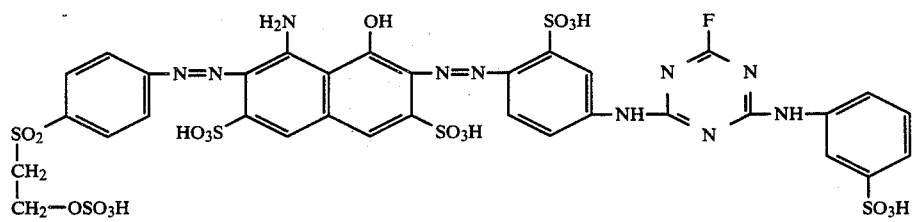

is obtained in the form of a black, electrolyte-containing powder. This compound has very good dyestuff properties. It yields, according to the application and fixation processes usual in the industrial practice, black dyeings and prints on cellulose fiber material which have very good fastness to wear and tear and to processing. Likewise black dyeings are obtained from a weakly acidic bath on wool, the wet fastness of which are excellent after ammoniacal after-treatment.

EXAMPLES 125 TO 130

Operations for preparing a compound of formula (1) are in accordance with the invention for example, analogous to Example 124, that is, reaction of a diazo component having a β-sulfatoethylsulfonyl group with a 1-amino-8-naphthol-3,6- or -4,6-disulfonic acid, and subsequent coupling of a second diazo component made from a condensation product of a diaminobenzene compound with cyanuric fluoride and an amino compound. When starting components are used as those indicated in an Example of the following Table according to the following formula (A)

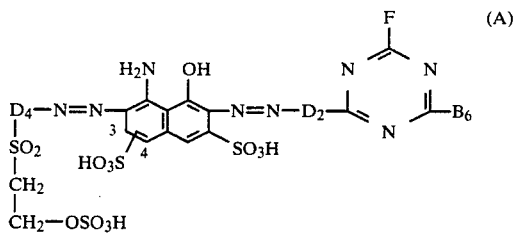

the corresponding disazo compounds of the invention according to the formula (A) is obtained which has valuable fiber-reactive dyestuff properties and dyes cellulose fiber materials and wool in a fast color and the shade as indicated in that Example.

100 parts of water and 50 parts by volume of an aqueous 2N-sodium hydroxide solution, at a temperature of about 0° C. in the course of 12 to 17 minutes, while adding, also slowly, an aqueous sodium hydroxide solution in order to maintain a pH of 6. After the condensation reaction is complete, a neutral solution of 18.8 parts of 1,4-diaminobenzene-2-sulfonic acid in 200 parts of water is added; this second condensation reaction is carried out at a pH of 6 to 7 under a several hours' agitation at 19°–21° C., the pH being maintained by means of sodium hydroxide solution. The condensation being complete, 35 parts by volume of an aqueous 31% hydrochloric acid and 500 parts of ice are added to the solution, which is then diazotized by slowly adding 20 parts by volume of an aqueous 5N sodium nitrite solution at 0° to 5° C. After having destroyed excess nitrous acid, the diazonium salt solution is adjusted to pH 2.5 to 3.0 by means of sodium acetate, and in cold state introduced slowly (dropwise) into a solution of 31.9 parts of 1-amino-8-naphthol-3,6-disulfonic acid in 1,500 parts of water; the pH being maintained at 2.5–3.0 by means of sodium acetate. The coupling being complete, the monoazo compound formed is precipitated with potas-

| Ex. | D₄ | D₂ | B₆ | position of sulfo group | shade on cotton |
|---|---|---|---|---|---|
| 125 | Br–⌬ | ⌬–SO₃H (with SO₃H) | –N(CH₃)–C₆H₅ | 3 | black |
| 126 | ⌬–SO₃H | ⌬–SO₃H | –N(CH₃)–CH₂–CH₂–SO₃H | 3 | black |
| 127 | ⌬ | HO₃S–⌬ | –NH–CH₂–CH₂–OH | 3 | navy blue |
| 128 | ⌬–SO₃H (ortho) | Cl–⌬ | –NH–CH₂–CH₂–SO₃H | 3 | black |
| 129 | ⌬ | ⌬–SO₃H | –N(C₂H₅)₂ | 4 | navy blue |
| 130 | Cl,Cl–⌬ | ⌬–SO₃H | –NH₂ | 3 | greenish black |

EXAMPLE 131

13.7 Parts of cyanuric fluoride are slowly added to a solution made of 17.3 parts of aniline-3-sulfonic acid in sium chloride, and suction-filtered. Without previous drying, it is dissolved in 2,000 parts of water. This monoazo compound solution is then combined at pH 5.5 to 6.5 with a diazonium salt suspension of 28.1 parts of aniline-4-β-sulfatoethylsulfone. The coupling reaction is completed at this pH with agitation for several hours, the disazo compound formed is precipitated with sodium chloride, suction-filtered and dried.

A black, electrolyte-containing powder containing the alkali metal salt, substantially sodium salt, of the compound of the formula which is characterized in the Examples of the following Table by the indicated radicals, is prepared analogously to the operation methods described in the preceding Example i.e. by correspondingly preparing first a diazo component being the reaction product of an amine, cyanuric fluoride and a diaminobenzene compound, diazotizing same and coupling it onto 1-amino-8-naphthol-3,6- or -4,6-disulfonic acid, and subsequently react-

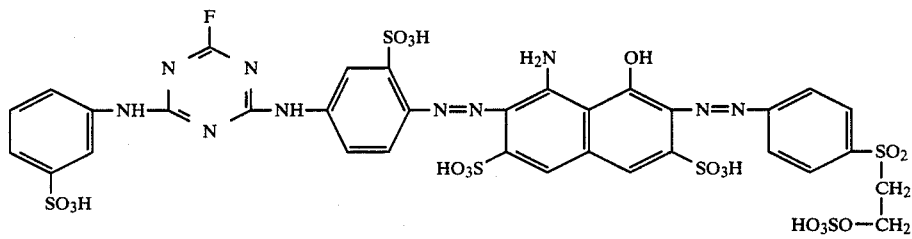

in an amount of about 50% is obtained. This diazo compound has very good dyestuff properties and, according to the known and usual methods, dyes cellulose fiber materials such as cotton in intense black shades having very good fastnesses to wear and tear and to processing, especially very good fastnesses to washing, water, perspiration, alkalis and acids.

EXAMPLES 132 TO 142

A disazo compound of the invention according to the formula (B)

ing the monoazo compound formed with an aniline derivative containing a β-sulfatoethylsulfonyl group as second diazo component. These reaction components are listed in the Table in connection with the formula (B). The disazo compounds of the invention according to Examples 132 to 142 have likewise very good fiber-reaction dyestuff properties and yield on cotton, for example, fast dyeings having the shades as indicated.

(B)

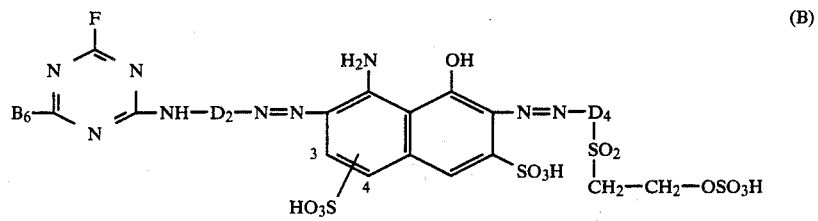

| Example | B$_6$ | D$_2$ | D$_4$ | Position of HO$_3$S— | Shade on cotton |
|---|---|---|---|---|---|
| 132 | phenyl-N(CH$_3$)— | 2,5-di(SO$_3$H)-phenyl | phenyl | 3 | greenish navy blue |
| 133 | phenyl-N(C$_2$H$_5$)— | 2,5-di(SO$_3$H)-phenyl | phenyl | 3 | navy blue |
| 134 | 2-CH$_3$-phenyl-NH— | 2-SO$_3$H-phenyl | 2-SO$_3$H-phenyl | 3 | black |

-continued

| Example | B6 | D2 | D4 | Position of HO3S— | Shade on cotton |
|---|---|---|---|---|---|
| 135 | CH2—CH2—NH—<br>\|<br>OH | SO3H-phenyl | 2,5-di-OCH3-phenyl | 3 | greenish black |
| 136 | 3-SO3H-phenyl-NH— | 4-CH3-phenyl-SO3H | phenyl | 3 | black |
| 137 | 3-SO3H-phenyl-NH— | 4-CH3-phenyl-SO3H | phenyl | 4 | black |
| 138 | 3-SO3H-phenyl-NH— | 4-CH3-phenyl-SO3H | 2-OCH3-5-CH3-phenyl | 3 | black |
| 139 | H2N— | 2,5-di-SO3H-phenyl | 2-Br-phenyl | 3 | greenish black |
| 140 | (C2H5)2N— | 2,5-di-SO3H-phenyl | 2,3-di-Cl-phenyl | 3 | black |
| 141 | CH2—CH2—N—<br>\|      \|<br>SO3H  CH3 | SO3H-phenyl | 4-Cl-phenyl | 3 | black |
| 142 | CH2—CH2—NH—<br>\|<br>COOH | SO3H-phenyl | SO3H-phenyl | 3 | black |

We claim:
1. A compound containing one or more sulfonic acid groups, of the formula

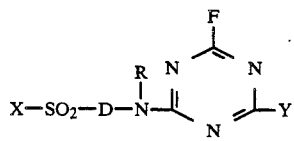

wherein:

D is the radical of an organic dye molecule of the formula

—K$_2$—N=N—A$_x$— or

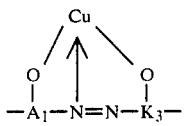

in which

A$_x$ is phenylene or phenylene substituted by substituents selected from the group consisting of lower alkyl, lower alkoxy, carboxy, lower alkanoylamino, benzoylamino, sulfo-benzoylamino, phenylamino, sulfophenylamino, carbamoyl, carbamoyl monosubstituted or disubstituted by lower alkyl, phenyl or both, sulfamoyl, sulfamoyl monosubstituted or disubstituted by lower alkyl, phenyl or both, cyano, nitro, chlorine, bromine, fluorine, trifluoromethyl, hydroxy and sulfo, or is a naphthylene unsubstituted or substituted by substituents selected from the group consisting of sulfo, carboxy, methyl, ethyl, methoxy, ethoxy, lower alkanoylamino, benzoylamino, chlorine, hydroxy and nitro, K$_2$ is 2-amino-naphthylene or 2-amino-naphthylene substituted by one or two sulfonic acid groups, or K$_2$ is pyrazol-5-on-4-yl substituted in the 3-position by methyl, carboxy, carbamoyl, lower carbalkoxy or phenyl, and substituted by phenyl or naphthyl bonded in the 1-position, it being possible for this phenyl to be substituted by 1 or 2 sulfo groups or by 1 or 2 substituents selected from the group consisting of lower alkyl, lower alkoxy, chlorine, bromine, nitro, lower alkanoylamino, substituted alkanoylamino, benzoylamino, substituted benzoylamino and carboxy, or by these groups and by 1 or 2 sulfo groups, and for the naphthyl to be substituted by 1, 2 or 3 sulfo groups or by one substituent selected from the group consisting of lower alkyl, lower alkoxy, nitro, lower alkanoylamino, substituted alkanoylamino, benzoylamino, substituted benzoylamino and carboxy, or by one of these groups and one, two or three sulfo groups, A$_1$ is a benzene ring containing no additional substituents or one or two additional substituents (which may be the same or different) selected from the group consisting of lower alkyl, lower alkoxy, carboxy, phenylamino, sulfobenzoylamino, sulfophenylamino, carbamoyl, carbamoyl which is monosubstituted or disubstituted by lower alkyl, phenyl or both, sulfamoyl, sulfamoyl which is monosubstituted or disubstituted by lower alkyl, phenyl or both, cyano, nitro, chlorine, bromine, trifluoromethyl and sulfo, or A$_1$ is a naphthalene ring, or a naphthalene ring substituted by 1, 2 or 3 sulfo groups or by a carboxy, methyl, methoxy, ethoxy, nitro, acetylamino or chlorine or by a carboxy, methyl, methoxy, ethoxy, nitro, acetylamino or chlorine and 1, 2 or 3 sulfo groups, K$_3$ is a naphthalene ring, which is substituted by one or two sulfonic acid groups as additional substituents, the complex-forming oxygen atoms being bonded to A$_1$ and K$_3$ in the ortho-positions each relative to the azo group, R is hydrogen or alkyl of 1 to 4 C-atoms, X is β-sulfatoethyl, and Y is a group of the formula

in which

R$^2$ is hydrogen, alkyl of from 1 to 4 carbon atoms unsubstituted or substituted by 1 or 2 substituents selected from the group consisting of acetylamino, hydroxy, sulfato, lower alkoxy, sulfo, carboxy, phenyl, naphthyl, phenyl substituted by sulfo, carboxy, methyl, ethyl, methoxy, ethoxy, chlorine, carbamoyl, sulfamoyl or a combination thereof, and naphthyl substituted by chlorine, methyl, methoxy, ethoxy, sulfo, carboxy, or a combination thereof or is cyclohexyl, R$^3$ is hydrogen, alkyl of from 1 to 4 carbon atoms unsubstituted or substituted by 1 or 2 substituents selected from the group of acetylamino, hydroxy, sulfato, lower alkoxy, sulfo, carboxy, phenyl, naphthyl, phenyl substituted by sulfo, carboxy, methyl, ethyl, methoxy, ethoxy, chlorine, carbamoyl, sulfamoyl or a combination thereof, and naphthyl substituted by chlorine, methyl, methoxy, ethoxy, sulfo, carboxy or a combination thereof, or R$^3$ is phenyl or naphthyl, each unsubstituted or substituted by carboxy, sulfo, lower alkyl, lower alkoxy, hydroxy or chlorine, or R$^2$ and R$^3$ together with the nitrogen atom form the morpholino, piperidino or piperazino ring radical.

2. A compound according to claim 1, of the formula

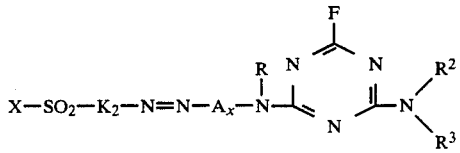

in which A$_x$, R, R$^2$, R$^3$ and X are defined as in claim 1 and K$_2$ is 2-amino-naphthylene or 2-amino-naphthylene substituted by one or two sulfonic acid groups.

3. A compound according to claim 1, of the formula

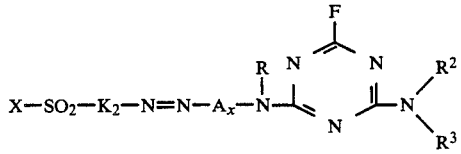

in which A$_x$, R, R$^2$, R$^3$ and X are defined as in claim 1 and K$_2$ is pyrazol-5-on-4-yl substituted in the 3-position by methyl, carboxy, carbamoyl, lower carbalkoxy or phenyl, and substituted by phenyl or naphthyl bonded in the 1-position, it being possible for this phenyl to be substituted by 1 or 2 sulfo groups or by 1 or 2 substituents selected from the group consisting of lower alkyl, lower alkoxy, chlorine, bromine, nitro, lower alkanoylamino, substituted alkanoylamino, benzoylamino, substituted benzoylamino and carboxy, or by these groups and by 1 or 2 sulfo groups, and for the naphthyl to be substituted by 1, 2 or 3 sulfo groups or by one substituent selected from the group consisting of lower alkyl, lower alkoxy, nitro, lower alkanoylamino, substituted alkanoylamino, benzoylamino, substituted benzoylamino and carboxy, or by one of these groups and one, two or three sulfo groups.
4. A compound according to claim 1, of the formula
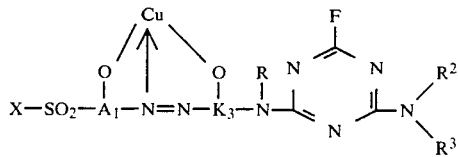
in which $A_1$, $K_3$, R, $R^2$, $R^3$ and X are defined as in claim 1.
* * * * *